United States Patent [19]
Takizawa

[11] Patent Number: 5,444,817
[45] Date of Patent: Aug. 22, 1995

[54] SPEECH RECOGNIZING APPARATUS USING THE PREDICTED DURATION OF SYLLABLES

[75] Inventor: Yumi Takizawa, Nara, Japan

[73] Assignee: Matsushita Electric Industrial Co., Ltd., Osaka, Japan

[21] Appl. No.: 955,487

[22] Filed: Oct. 2, 1992

[30] Foreign Application Priority Data

Oct. 2, 1991 [JP] Japan .................................. 3-255093
Mar. 5, 1992 [JP] Japan .................................. 4-048210
Jun. 18, 1992 [JP] Japan .................................. 4-159839

[51] Int. Cl.⁶ .............................................. G10L 9/00
[52] U.S. Cl. ................................. 395/2.63; 395/247.1
[58] Field of Search .......................... 395/2.6–2.66, 395/2.45–2.48; 381/41–45

[56] References Cited

U.S. PATENT DOCUMENTS

| | | | |
|---|---|---|---|
| 4,761,815 | 8/1988 | Hitchcock | 395/2.62 |
| 4,780,906 | 10/1988 | Rajasekaran | 395/2.6 |
| 4,799,261 | 1/1989 | Lin et al. | 395/2.63 |
| 4,914,703 | 4/1990 | Gillick | 395/2.48 |
| 4,918,731 | 4/1990 | Muroi | 395/2.62 |
| 4,979,212 | 12/1990 | Yamada et al. | 395/2.62 |
| 4,991,216 | 2/1991 | Fujii et al. | 395/2.63 |
| 5,129,002 | 7/1992 | Tsuboka | 395/2.65 |

FOREIGN PATENT DOCUMENTS 63-236094 9/1988 Japan .

OTHER PUBLICATIONS

S. E. Levinson, "Continuously variable duration hidden Markov models for automatic speech recognition", *Computer Speech and Language*, pp. 29–45 (1986).

Yumi Takizawa and Eiichi Tsuboka "Syllable Duration Prediction for Speech Recognition," pp. 1371–1374 (1992), *Int'l Conf. on Spoken Language Processing*.

K. F. Lee, *Automatic Speech Recognition*, Kluwer Academic Publishers, pp. 72–75 (1989).

Primary Examiner—Allen R. MacDonald
Assistant Examiner—Michael A. Sartori
Attorney, Agent, or Firm—Ratner & Prestia

[57] ABSTRACT

A speech recognizing apparatus designed to predicate a duration of a recognition unit to be subsequently recognized with the use of both of the duration of the recognition unit already recognized within an input speech and the duration of each recognition units learned and then to perform a matching with the use of the predicated duration so that it can be established as a recognition candidate only when the difference in duration of the recognition units within the input speech is realistic. The apparatus comprises a reference speech storage buffer for storing information of the reference speech for each recognition unit, a reference speech duration storage buffer for storing duration information of the reference speech, a duration predicator for predicating the duration of the input speech, a matching unit for performing a matching between the reference speech and the input speech for each recognition unit and outputting a recognition result and an input speech duration storage buffer for storing duration information of the recognition result.

14 Claims, 14 Drawing Sheets

SPEECH RECOGNIZING APPARATUS USING THE PREDICTED DURATION OF SYLLABLES

BACKGROUND OF THE INVENTION

1. Field of the Invention

The present invention relates to a speech recognizing apparatus.

2. Description of the Prior Art

With a recent progress of the art of speech recognition, not only a speech recognizing apparatus for recognizing a short utterance such as a syllable or a word, but also a speech recognizing apparatus for recognizing a long utterance such as a clause or a sentence which is generally referred to as a continuous speech recognition) have been developed. In the short utterance recognizing apparatus, a high performance apparatus has been realized by recognizing with the use of spectrum information of the speech. However, when it comes to the continuous speech recognition, since the long utterance period or length often results in a considerable deformation of the spectrum, it is not possible to maintain a high recognizing performance only with the spectrum information. Therefore, attempts have been made to improve the performance by the additional utilization of voices other than the spectrum information which have not hitherto been taken into consideration.

One of them is a recognizing method with the use of information of a speech duration. In the continuous speech recognition, since the utterance period or length is long, the recognition of all of the utterance period or lengths at one time is inefficient and therefore it is a general practice to employ the method in which the utterance periods are divided into a plurality of recognizing sections convenient for the speech recognition. With this recognizing method, a control of the duration of each speech period can result in an accomplishment of a high performance recognition without a result of recognition of an unnatural duration being outputted.

Hereinafter, the prior art speech recognizing apparatus of the above described type will further be discussed with reference to FIG. 10.

In FIG. 10, reference numeral 1 represents a speech input terminal to which a speech signal is inputted; reference numeral 2 represents an analyzer; reference numeral 3 represents a endpoint detector; reference numeral 4 represents a next syllable predicator; reference numeral 101 represents a matching unit; reference numeral 7 represents a recognition result output terminal; reference numeral 8 represents a standard speech spectrum calculator; reference numeral 102 represents a standard speech duration calculator; reference 10 represents a grammar and rule storage buffer; reference numeral 12 represents a standard speech storage buffer; reference numeral 104 represents a standard speech duration information storage buffer; also included is an input speech storage buffer; and reference numeral 14 represents a switch.

The prior speech recognizing apparatus of the above described construction operates in the following manner. At the time of a standard speech learning, a standard speech spoken in units of sentences is divided in terms of syllables and a speech for each syllable is inputted from the speech input terminal 1. The analyzer 2 then analyzes spectrum information necessary for a recognition. For the spectrum information referred to above, if, for example, the LPC cepstrum method is used, the LPC cepstrum coefficient comprising a set of a predetermined number of items for each frame is calculated as a characteristic parameter. The above described analyzing cycle is repeated until a predetermined number of learning speech data terminates. Then, the data analyzed for each syllable are clustered in the standard speech spectrum calculator 8 and data of interest in each cluster are stored in the standard speech spectrum storage buffer 12. The standard speech duration calculator 102 collects the durations of the durations of the learned speech in units of frames which are subsequently stored in the standard speech duration information storage buffer 104.

During the speech recognition, the speech signal is inputted through the speech input terminal 1 and the analyzer 2 analyzes the spectrum information for each frame. A method of this analysis is similar to that during the learning. Then, the endpoint detector 3 detects a speech period using an LPC cepstrum zero-order coefficient in the analyzer (It is to be noted that the zero-order coefficient is indicative of speech power information.). The speech period includes the following two conditions.

(1) The speech power (zero-order coefficient value) is greater than a predetermined value.

(2) A frame satisfying the condition (1) above succeeds in a number greater than a predetermined value.

Thereafter, the next syllable predicator 4 selects the syllable to be subsequently recognized for each frame with the use of the grammar and rules. By way of example, where the grammar and rules to be used are a context free grammar, the grammar and rule storage buffer 10 stores a dictionary of all words to be recognized and a tree structure of junction among the words, an example of which is shown in FIG. 11. When a recognizing process is to be carried out along a time axis, a syllable which would be neighboring the syllable candidate of the frame previously recognized is employed as the next syllable candidate.

The matching unit 101 performs a matching between the standard speech of the syllable candidate selected as described previously and the input speech. The matching is to determine the frame m and the syllable n which minimize a left term D of the following equation (1) by limiting the matching period to the maximum and minimum values of the duration for each syllable collected during the learning process. A high-ranked number m of syllable candidates which minimizes the distance D in the left term of the equation (1) is stored as a result of recognition in the recognition result storage buffer 12 together with the distance D. A result of this storage is used when the next succeeding syllable candidate is to be predicated.

$$D(i) = min[D(j) + Dn(j+1:i)] \qquad (1)$$

wherein D(i) represents the distance between the standard speech syllable row and the input speech to the i-th frame and Dn(j+1:i) represents the distance between the syllable n of the standard speech and the input speech from the (j+1)-th frame to the i-th frame. It is to be noted that the minimum value of the duration of the syllable n is smaller than the difference (i−j) which is in turn smaller than the maximum value of the duration of the syllable n.

Thereafter, a process of predicating and matching of the next succeeding syllable candidate is carried out from the start to the end of the speech period and the row of the syllable candidates which assumes the maximum value of the score S is outputted from the recognition result output terminal 7. The switch 14 operates to output the characteristic parameter to the standard speech spectrum calculator 8 during the learning process and to the endpoint detector 3 during the recognition process.

However, it has been found that the prior art speech recognizing apparatus has many problems. Specifically, since the duration of each syllable is controlled by the absolute value of the duration, an erroneous duration tends to be set if the speed of speech differs between the input speech and the standard speech. In order to accommodate all possible speeds of speech, a control of all possible speeds is necessary, resulting in a reduced processing efficiency and the learned speech tends to become bulky.

Also, with the above described construction, since the control of the duration is carried out by closing for each syllable, there is a problem in that, even when the difference in duration between the neighboring syllables is unrealistically large, it tends to establish a recognition candidate when the score is large.

SUMMARY OF THE INVENTION

The present invention has been devised with a view to substantially eliminating the above discussed problems inherent in the prior art speech recognizing apparatus and is intended to provide an improved speech recognizing apparatus capable of accomplishing a high performance speech recognition.

According to one aspect of the present invention, the duration is predicated by the utilization of information on the duration of a speech itself which has been inputted and is controlled with the use of the predicated duration. Accordingly, even though the speed of speech differs between the input speech and the standard speech, the control of the duration is possible and, only when the difference in duration between recognition units within the input speech is realistic, it is possible to establish a recognition candidate, thereby making it possible to realize a high performance apparatus.

According to another aspect of the present invention, since the duration is predicated with the use of the duration information of the input speech and information concerning the correlation between the recognition units of the standard speech, a more accurate predication can be carried out, thereby making it possible to realize a high performance apparatus.

According to a further aspect of the present invention, when the duration is to be predicated, one of the duration information of the input speech which has the highest necessity is preferentially used to accomplish the predication, thereby to making it possible to realize a high performance apparatus.

According to a still further aspect of the present invention, when the duration is to be predicated, one of the duration information of the input speech which is closest to an input speech portion to be recognized in terms of time is preferentially used to accomplish the predication, thereby to making it possible to realize a high performance apparatus.

According to a still further aspect of the present invention, when the duration is to be predicated, one of the duration information of the input speech which has the highest score during the matching is preferentially selected to accomplish the predication, thereby to making it possible to realize a high performance apparatus.

According to a still further aspect of the present invention, when the duration is to be predicated, input speech information is selected out from the input speech portion to be subsequently recognized, and the duration within the same utterance period to accomplish the accurate predication in a short time, thereby to making it possible to realize a high performance apparatus.

According to a still further aspect of the present invention, an optimum matching period for each recognition unit is determined with the use of the predicated duration and the matching is carried out within the obtained section, thereby making it possible to realize a high performance apparatus.

According to a yet further aspect of the present invention, the weighing value to be used at the time of matching is determined for the duration with the use of the predicated duration and the matching is carried out with the use of the determined weighing value, thereby making it possible to realize a high performance apparatus.

Thus, according to the present invention, only when the difference in duration between the recognition units in the input speech is realistic, it can be established as a recognition candidate, thereby making it possible to provide a high performance apparatus.

BRIEF DESCRIPTION OF THE DRAWINGS

These and other objects and features of the present invention will become clear from the following description taken in conjunction with preferred embodiments thereof with reference to the accompanying drawings, in which like parts are designated by like reference numerals and in which.

DETAILED DESCRIPTION OF THE EMBODIMENTS

First Embodiment

Figure 1A:
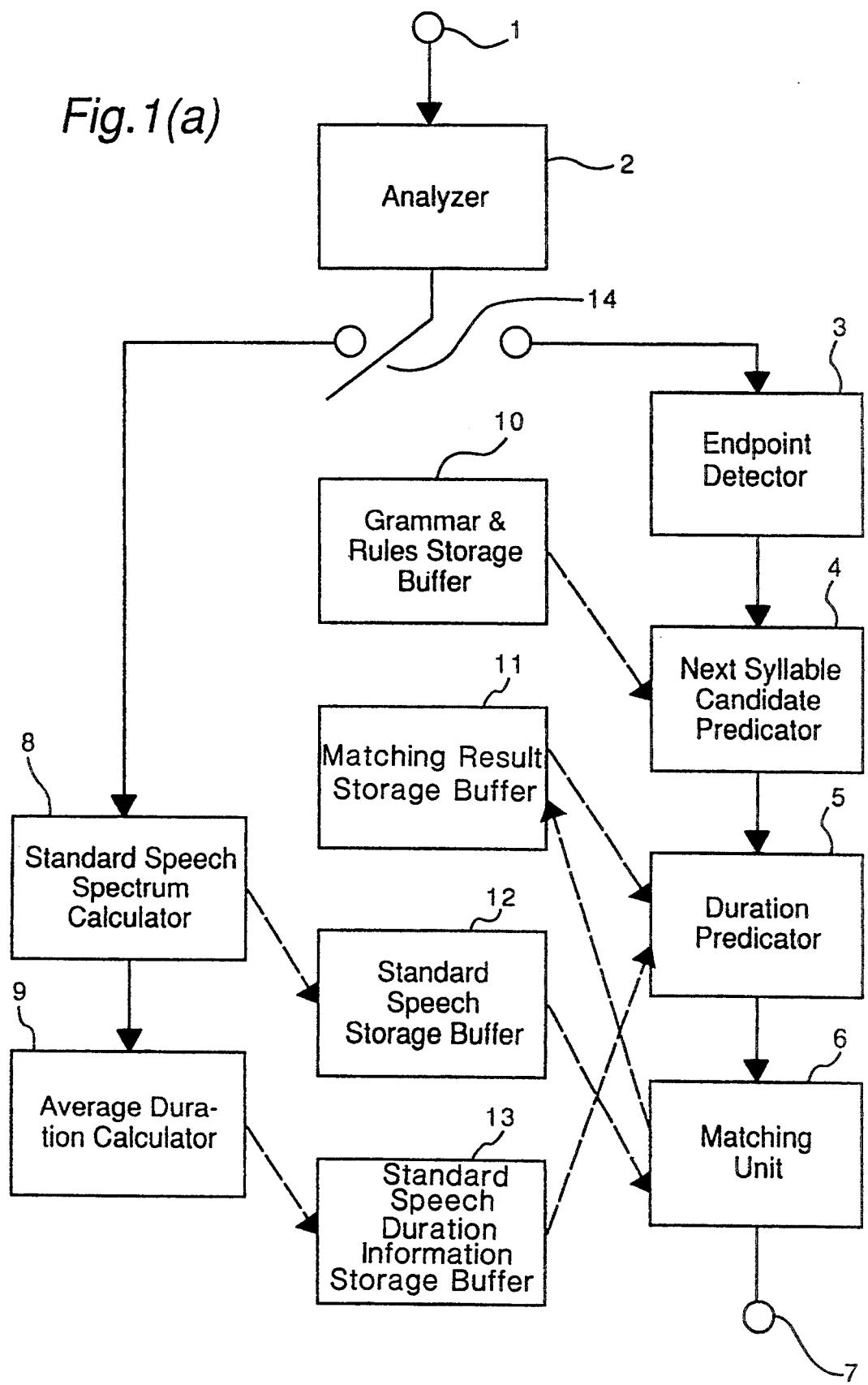
FIG. 1(a) and FIG. 1(b) is a schematic block diagram showing a speech recognizing apparatus according to a first preferred embodiment of the present invention.
Figure 1B:
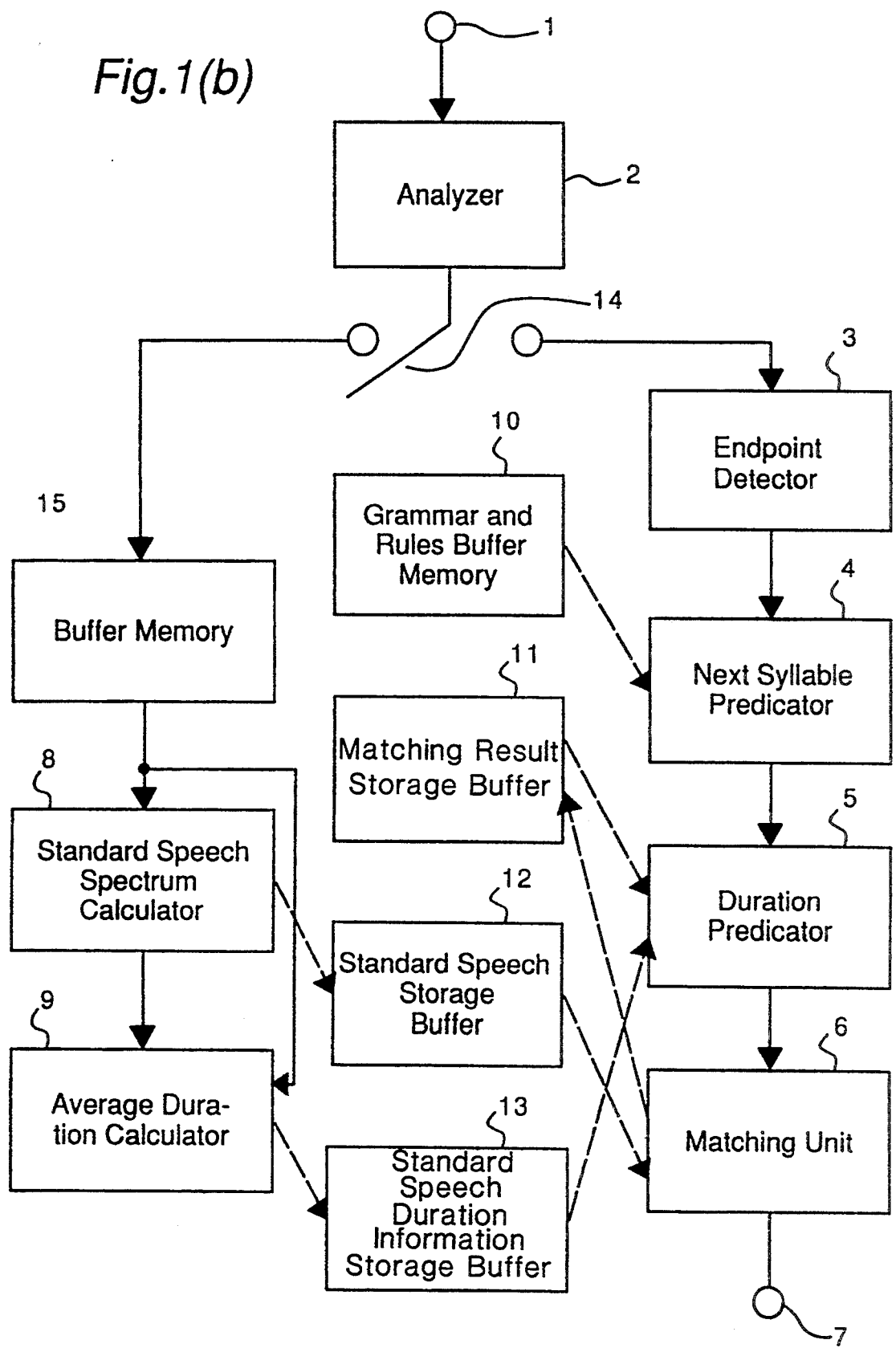

Referring to FIG. 1 showing a block diagram of a continuous speech recognizing apparatus according to a first embodiment of the present invention, reference numeral 1 represents a speech input terminal to which a speech signal is inputted; reference numeral 2 represents an analyzer; reference numeral 3 represents a endpoint detector; reference numeral 4 represents a next syllable predicator; reference numeral 5 represents a next syllable duration predicator; reference numeral 6 represents a matching unit; reference numeral 7 represents a recognition result output terminal; reference numeral 8 represents a standard speech spectrum calculator; reference numeral 9 represents an average duration calculator for calculating an average duration for each speech type as will be described later; reference 10 represents a grammar and rule storage buffer; reference numeral 11 represents an matching result storage buffer; reference numeral 12 represents a standard speech storage buffer; reference numeral 13 represents an standard speech duration information storage buffer; reference numeral 14 represents a switch; and reference numeral 15 represents a buffer memory.

Figure 12:
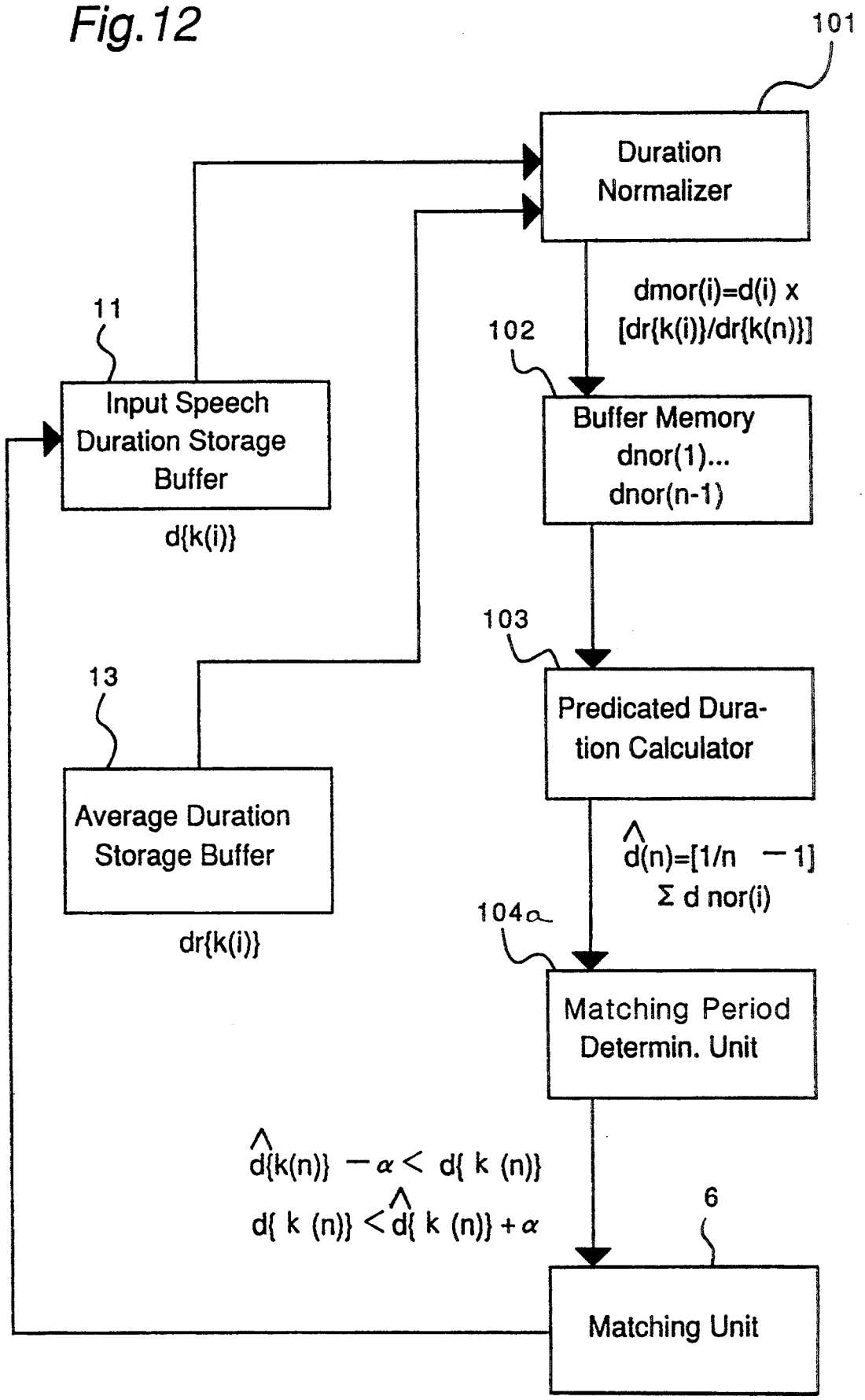
FIG. 12 is a block diagram of the syllable duration predicator shown in FIG. 1.
Figure 13:
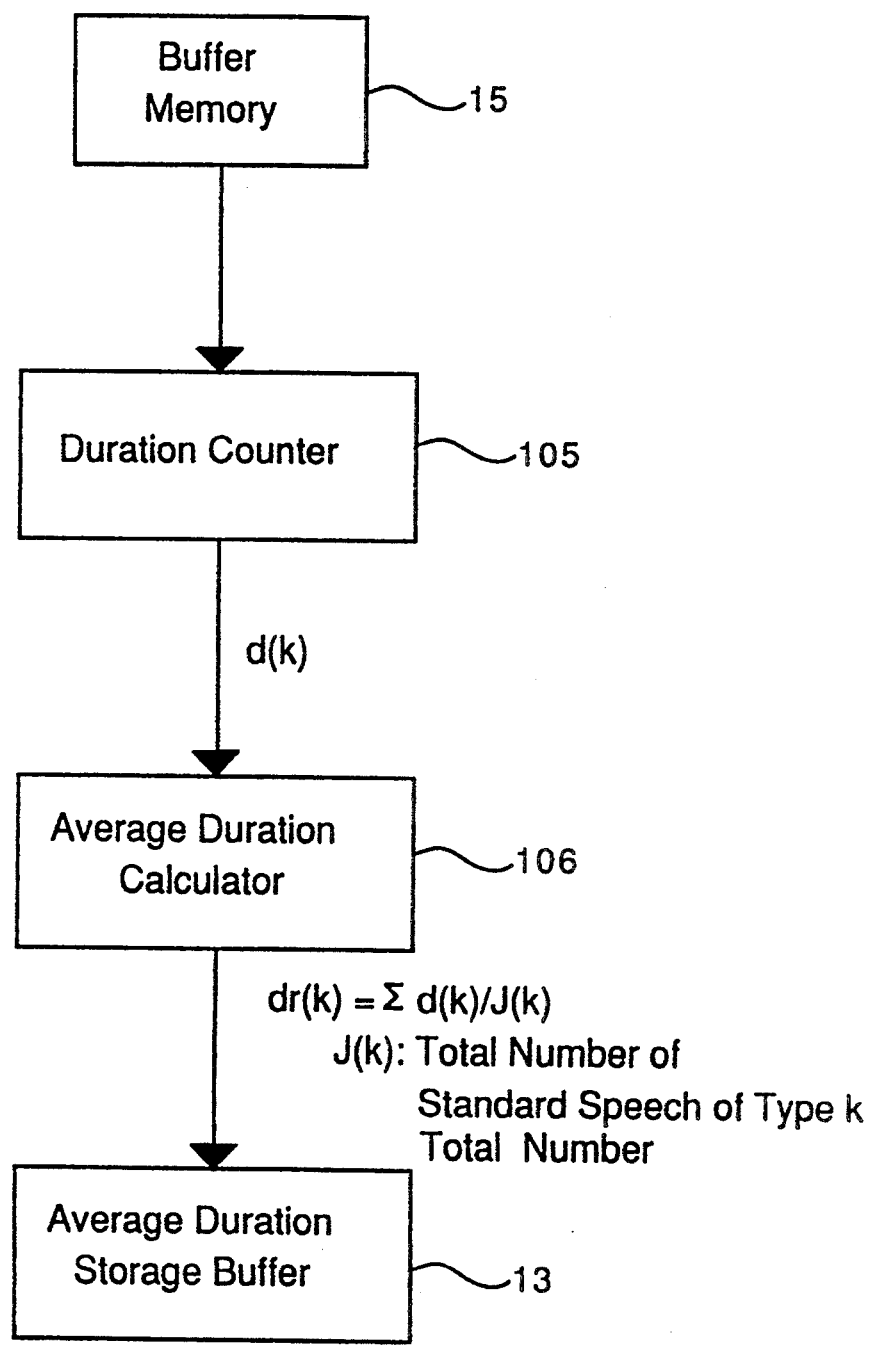
FIG. 13 is a block diagram of the average duration calculator shown in FIG. 1.

In FIGS. 12 and 13 which illustrate the details of the next syllable duration predicator 5 and the average duration calculator 9, respectively, reference numeral 101 represents a duration normalizer: reference numeral 102 represents a buffer memory; reference numeral 103 represents a duration predication value calculator 103; reference numeral 104 represents a matching period determining unit; reference numeral 105 represents a duration counter for counting the duration for each standard speech type; and reference numeral 106 represents an average duration calculator. It is to be noted that elements similar to those described in connection with the prior art apparatus are designated by like reference numerals.

The speech recognizing apparatus of the above described construction operates in the following manner. At the time of a standard speech learning, a standard speech spoken in units of sentences is divided in terms of syllables and a speech for each syllable is inputted from the speech input terminal 1. The analyzer 2 then analyzes spectrum information necessary for a recognition. For the spectrum information referred to above, if, for example, the LPC cepstrum method is used, the LPC cepstrum coefficient comprising a set of a predetermined number of items for each frame is calculated as a characteristic parameter and is then stored in the buffer memory 15. The above described analyzing cycle is repeated until a predetermined number of learning speech data terminates.

Then, the data stored in the buffer memory 15 are clustered in the standard speech spectrum calculator 8 and data of interest in each cluster are stored in the standard speech spectrum storage buffer 12.

Thereafter, the average duration dr for each syllable data stored in the buffer memory 15 is calculated by the average duration calculator 9. For this purpose, the duration of each syllable data is calculated by the duration counter 105. For example, this can be accomplished by counting the number of a row of the LPC cepstrum coefficients comprising a set of a predetermined number of items of each data. Then, an average value of the durations for the syllables is calculated by the average duration calculator 106 for each type, followed by a storage in the standard speech duration storage buffer 13 for each syllable type.

During the speech recognition, the speech signal is inputted through the speech input terminal 1 and the analyzer 2 analyzes the spectrum information for each frame. A method of this analysis is similar to that during the learning. Then, the endpoint detector 3 detects a speech period using an LPC cepstrum zero-order coefficient in the analyzer (It is to be noted that the zero-order coefficient is indicative of speech power information.). The speech period includes the following two conditions.

(1) The speech power (zero-order coefficient value) is greater than a predetermined value.

(2) A frame satisfying the condition (1) above succeeds in a number greater than a predetermined value.

Thereafter, the next syllable predicator 4 selects the syllable to be subsequently recognized for each frame with the use of the grammar and rules. By way of example, where the grammar and rules to be used are a context free grammar, the grammar and rule storage buffer 10 stores a dictionary of all words to be recognized and a tree structure of junction among the words. The contents of the grammar and rule storage buffer 10 are as usual as hitherto used. When a recognizing process is to be carried out along a time axis, a syllable which would be neighboring the syllable candidate of the frame previously recognized is employed as the next syllable candidate.

The next syllable duration predicator 5 calculates the duration of the next succeeding syllable with the use of the following equation (2). This equation is used to predicate the duration of the n-th syllable candidate k as the (n−1)-th syllable has already been recognized with the duration d(i) of the speech stored in the matching result storage buffer 11 along the time axis.

$$\hat{d}(n) = \frac{1}{n-1-j} \sum_{i=j}^{n-1} d(i) \times \frac{dr\{k(i), k(i-1) \ldots k(i-r)\}}{dr\{k(n), k(n-1) \ldots k(n-r)\}} \times w(i) \quad (2)$$

wherein $\hat{d}(n)$ represents the predicated value of the duration of the n-th syllable; d(i) represents the duration of the i-th syllable; w(i) represents the weighing value of the duration of the i-th syllable; k(n) represents the type of the n-th syllable; and dr{k(n), k(n−1), k(n−r)} represents the average duration of k(n) when the respective types of the (n−r)-th to n-th syllables are k(n), K(n−1), ... k(n−r).

The weighing value w(i) is determined by a factor that affects the duration of the syllable, other than the syllable type, but is fixed to be 1 in the illustrated instance. The parameter n−1−j represents the number of syllables already recognized for use in predicating the predicated value d(n) and, if the parameter j is fixed to be 1 in the illustrated instance, the predication is achieved with the use of the duration of all of the syllables recognized within the framework of the input speech. The parameter r represents the number of syllables neighboring the syllable to be used for calculating the parameter dr and, if this parameter r is fixed to be 1, the parameter dr can be calculated having been classified for each syllable type. In such case, the above equation can be rewritten as follows.

$$\hat{d}(n) = \frac{1}{n-1} \sum_{i=1}^{n-1} d(i) \times \frac{dr\{k(i)\}}{dr\{k(n)\}} \quad (3)$$

In the embodiment now under discussion, the equation (3) is employed.

In the first place, each of the durations d(i) of the n−1 syllables is normalized by the duration normalizer 101 with reference to the average duration dr{k(i)} determined during the learning process and the normalized duration is then stored in the buffer memory 102. Then, the average value of the normalized durations is rendered by the duration predication value calculator 103 to be the predicted value.

Then, the matching period determining unit 104 defines a matching period in which the duration of the n-th syllable lies within the scope shown by the following equation (4), and the matching unit 6 performs a matching according to the equation (1).

$$\hat{d}(kn) - a < \hat{d}(kn) < \hat{d}(kn) + a \quad (4)$$

wherein $a$ represents a constant value.

Thereafter, a process of predicating and matching of the next succeeding syllable candidate is carried out from the start to the end of the speech period and the row of the syllable candidates which assumes the minimum value of the score S is outputted from a recognition result output unit. The switch 14 operates to output the characteristic parameter to the standard speech spectrum calculator 8 during the learning process and to the endpoint detector 3 during the recognition process.

As hereinabove described, according to the first embodiment of the present invention, by storing the average duration of the standard syllable for each syllable type in the average duration storage buffer, storing the duration of a speech portion of the inputted speech which has already been recognized in the matching result storage buffer, predicating the duration for each recognition unit of the input speech to be recognized with the use of the equation (3), using a ratio between the duration of the syllable already recognized by the duration predicator and the average duration, and making a matching within a predetermined scope with the duration predicated by the matching unit taken as a center, it is possible to establish it as a recognition candidate only when the difference between the durations of the respective recognition units within the inputted speech is realistic, thereby making it possible to provide a high performance apparatus.

It is to be noted that, while the foregoing embodiment is directed to a method of predicating the duration with reference to the syllable type which affects the duration, where the element that affects the duration is unknown, a method may be employed wherein during the leaning process, the weighing value w(i) is learnt so as to minimize the predication error with the use of the following equation (5) so that the recognition can be achieved during the recognizing process with the use of the weighing value w(i).

$$\hat{d}(n) = \frac{1}{n-1-j} \sum_{i=1}^{n-1} d(i) \times w(i) \quad (5)$$

Second Embodiment

Figure 2:
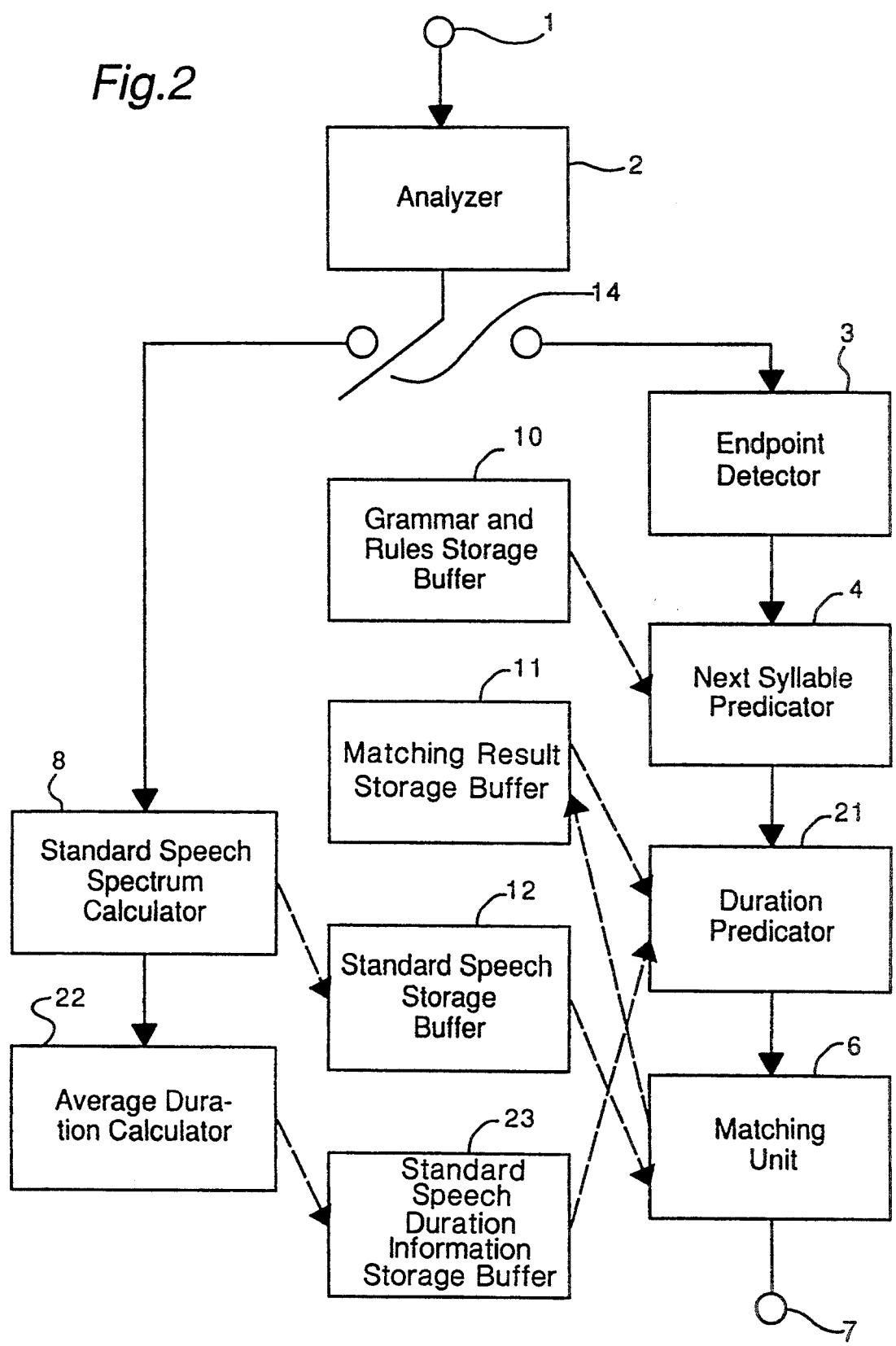
FIGS. 2 to 9 are diagrams similar to FIG. 1, showing second to ninth preferred embodiments of the present invention, respectively.

The continuous speech recognizing apparatus according to a second preferred embodiment of the present invention is shown in FIG. 2. Referring now to FIG. 2, reference numeral 1 represents a speech input terminal to which a speech signal is inputted; reference numeral 2 represents an analyzer; reference numeral 3 represents a endpoint detector; reference numeral 4 represents a next syllable predicator; reference numeral 21 represents a duration predicator; reference numeral 6 represents a matching unit; reference numeral 7 represents a recognition result output terminal; reference numeral 8 represents a standard speech spectrum calculator; reference numeral 22 represents an average duration calculator for calculating an average duration for each standard speech position; reference numeral 10 represents a grammar and rule storage buffer; reference numeral 11 represents an matching result storage buffer; reference numeral 12 represents a standard speech storage buffer; reference numeral 23 represents an standard speech duration storage buffer for storing the average duration for each position; and reference numeral 14 represents a switch.

The speech recognizing apparatus of the above described construction operates in the following manner. At the time of a standard speech learning, a standard speech spoken in units of sentences is divided in terms of syllables and a speech for each syllable is inputted from the speech input terminal 1. The analyzer 2 then analyzes spectrum information necessary for a recognition. For the spectrum information referred to above, if, for example, the LPC cepstrum method is used, the LPC cepstrum coefficient comprising a set of a predetermined number of items for each frame is calculated as a characteristic parameter. The above described analyzing cycle is repeated until a predetermined number of learning speech data terminates. Then, the data analyzed for each syllable are clustered in the standard speech spectrum calculator 8 and data of interest in each cluster are stored in the standard speech storage buffer 12.

Thereafter, the average syllable duration for each position within the utterance group of the standard speech is calculated by the average duration calculator 22 and is then stored in the standard speech duration storage buffer 23.

During the speech recognition, the speech signal is inputted through the speech input terminal 1 and the analyzer 2 analyzes the spectrum information for each frame. A method of this analysis is similar to that during the learning. Then, the endpoint detector 3 detects a speech period using an LPC cepstrum zero-order coefficient in the analyzer 2 (It is to be noted that the zero-order coefficient is indicative of speech power information.). The speech period includes the following two conditions.

(1) The speech power (zero-order coefficient value) is greater than a predetermined value.

(2) A frame satisfying the condition (1) above succeeds in a number greater than a predetermined value.

Thereafter, the next syllable predicator 4 selects the syllable to be subsequently recognized for each frame with the use of the grammar and rules. By way of example, where the grammar and rules to be used are a context free grammar, the grammar and rule storage buffer 10 stores a dictionary of all words to be recognized and a tree structure of junction among the words. The contents of the grammar and rule storage buffer 10 are as usual as hitherto used. When a recognizing process is to be carried out along a time axis, a syllable which would be neighboring the syllable candidate of the frame previously recognized is employed as the next syllable candidate.

The next syllable duration predicator 5 calculates the duration of the next succeeding syllable with the use of the following equation (6). This equation is used to predicate the duration of the n-th syllable candidate k as the (n−1)-th syllable has already been recognized with duration d(i) of the speech stored in the matching result storage buffer along the time axis.

$$\hat{d}(n) = \frac{1}{n-1-j} \sum_{i=j}^{n-1} d(i) \times \frac{dr\{p(i)\}}{dr\{p(n)\}} \times w(i) \quad (6)$$

wherein $\hat{d}(n)$ represents the predicated value of the duration of the n-th syllable; d(i) represents the duration of the i-th syllable; w(i) represents the weighing value of the duration of the i-th syllable; p(n) represents the position of the n-th syllable; and dr{p(n)} represents the average duration of p(n) when the position of the n-th syllable within the utterance group is p(n).

The weighing value w(i) is determined by a factor that affects the duration of the syllable, other than the syllable type, but is fixed to be 1 in the illustrated instance. The parameter n−1−j represents the number of syllables already recognized for use in predicating the predicated value d(n) and, if the parameter j is fixed to be 1 in the illustrated instance, the predication is achieved with the use of the duration of all of the syllables recognized within the framework of the input speech. The parameter r represents the number of syllables neighboring the syllable to be used for calculating the parameter dr and, if this parameter r is fixed to be 1, the parameter dr can be calculated having been classified for each syllable type. In such case, the above equation can be rewritten as follows.

$$\hat{d}(n) = \frac{1}{n-1} \sum_{i=j}^{n-1} d(i) \times \frac{dr\{p(i)\}}{dr\{p(n)\}} \times w(i) \qquad (7)$$

Then, the matching unit 6 determines that the duration of the n-th syllable falls within the range expressed by the following equation (8), and then restricts a matching period to that scope so as to perform the matching according to the equation (1) discussed in connection with the prior art. A result of the matching, an end frame of the syllable and the duration of the syllable are stored in the matching result storage buffer 11.

$$\hat{d}(pn) - a < \hat{d}(pn) < \hat{d}(pn) + a \qquad (8)$$

wherein α represents a constant value.

Thereafter, a process of predicating and matching of the next succeeding syllable candidate is carried out from the start to the end of the speech period and the row of the syllable candidates which assumes the minimum value of the score S is outputted from a recognition result output unit. The switch 14 operates to output the characteristic parameter to the standard speech spectrum calculator 8 during the learning process and to the endpoint detector 3 during the recognition process.

As hereinabove described, according to the second embodiment of the present invention, by storing the average duration of the standard syllable for each syllable position within the utterance group in the average duration storage buffer, storing the duration of a speech portion of the inputted speech which has already been recognized in the input speech duration storage buffer, predicating the duration for each recognition unit of the input speech to be recognized with the use of the equation (7), using a ratio between the duration of the syllable already recognized by the duration predicator and the average duration, and making a matching within a predetermined scope with the duration predicated by the matching unit taken as a center, it is possible to establish it as a recognition candidate only when the difference between the durations of the respective recognition units within the inputted speech is realistic, thereby making it possible to provide a high performance apparatus.

Third Embodiment

Figure 3:
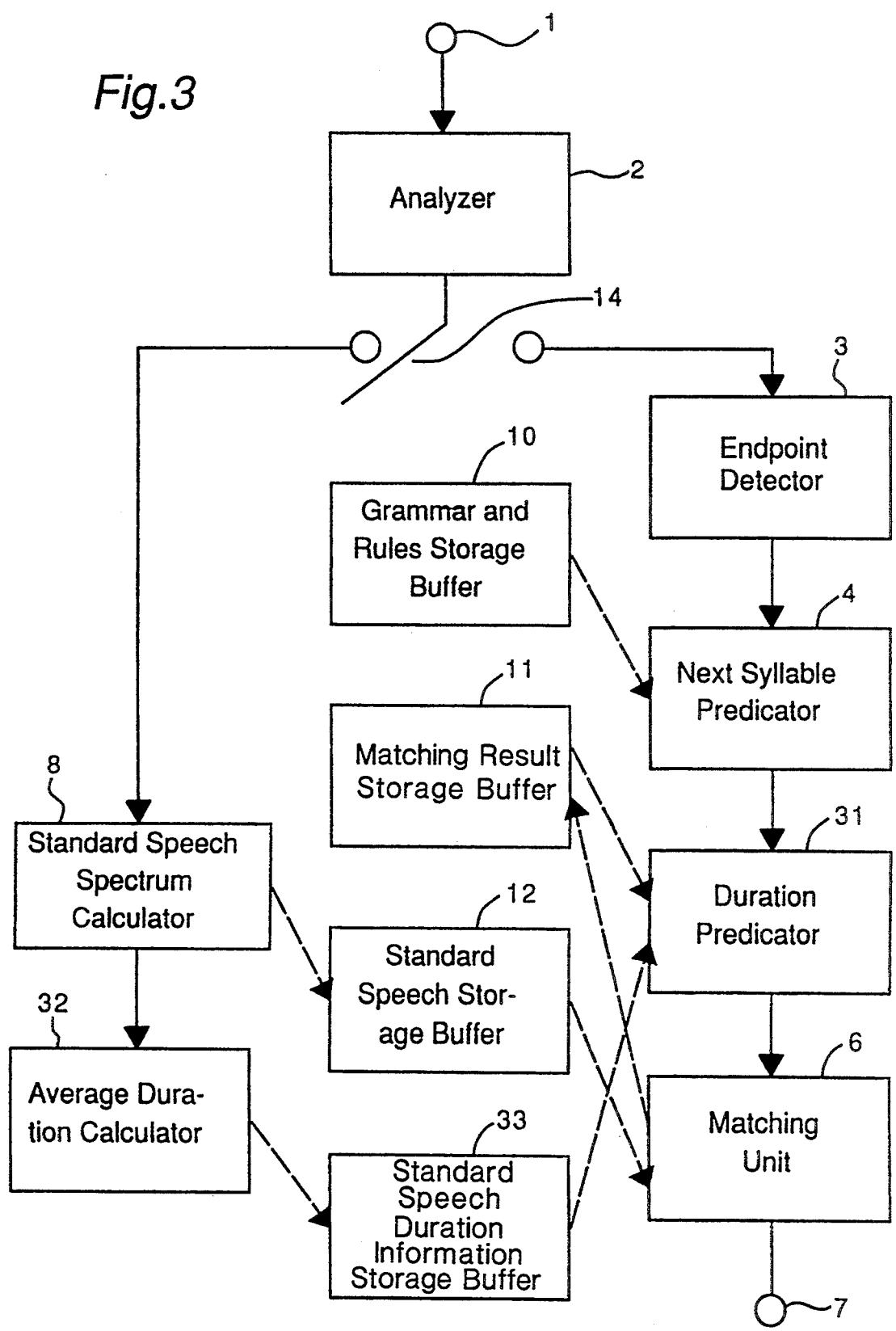

The continuous speech recognizing apparatus according to a third preferred embodiment of the present invention is shown in FIG. 3. Referring now to FIG. 3, reference numeral 1 represents a speech input terminal to which a speech signal is inputted; reference numeral 2 represents an analyzer; reference numeral 3 represents a endpoint detector; reference numeral 4 represents a next syllable predicator; reference numeral 31 represents a duration predicator; reference numeral 6 represents a matching unit; reference numeral 7 represents a recognition result output terminal; reference numeral 8 represents a standard speech spectrum calculator; reference numeral 32 represents a standard speech average duration calculator; reference 10 represents a grammar and rule storage buffer; reference numeral 11 represents an input speech duration storage buffer; reference numeral 12 represents a standard speech spectrum storage buffer; reference numeral 33 represents a standard speech standard duration information storage buffer; and reference numeral 14 represents a switch.

The speech recognizing apparatus of the above described construction operates in the following manner. At the time of a standard speech learning, a standard speech spoken in units of sentences is divided in terms of syllables and a speech for each syllable is inputted from the speech input terminal 1. The analyzer 2 then analyzes spectrum information necessary for a recognition. For the spectrum information referred to above, if, for example, the LPC cepstrum method is used, the LPC cepstrum coefficient comprising a set of a predetermined number of items for each frame is calculated as a characteristic parameter. The above described analyzing cycle is repeated until a predetermined number of learning speech data terminates. Then, the data analyzed for each syllable are clustered in the standard speech spectrum calculator 8 and data of interest in each cluster are stored in the standard speech spectrum storage buffer 12.

Thereafter, at the standard speech average duration calculator 32, the average syllable duration dr1 for each position and the average duration dr2 for each syllable type both defined in connection with the previous embodiment of the present invention are stored in the standard speech duration information storage buffer 33.

During the speech recognition, the speech signal is inputted through the speech input terminal 1 and the analyzer 2 analyzes the spectrum information for each frame. A method of this analysis is similar to that during the learning. Then, the endpoint detector 3 detects a speech period using an LPC cepstrum zero-order coefficient in the analyzer (It is to be noted that the zero-order coefficient is indicative of speech power information.). The speech period includes the following two conditions.

(1) The speech power (zero-order coefficient value) is greater than a predetermined value.

(2) A frame satisfying the condition (1) above succeeds in a number greater than a predetermined value.

Thereafter, the next syllable predicator 4 selects the syllable to be subsequently recognized for each frame with the use of the grammar and rules. By way of example, where the grammar and rules to be used are a context free grammar, the grammar and rule storage buffer 10 stores a dictionary of all words to be recognized and a tree structure of junction among the words. The contents of the grammar and rule storage buffer 10 are as usual as hitherto used. When a recognizing process is to be carried out along a time axis, a syllable which would be neighboring the syllable candidate of the frame previously recognized is employed as the next syllable candidate.

The next syllable duration predicator 5 calculates the duration of the next succeeding syllable with the use of the following equation (9). This equation is used to predicate the duration of the n-th syllable candidate k as the (n−1)-th syllable has already been recognized along the time axis.

$$\hat{d}(n) = \frac{1}{n-1-j} \sum_{i=j}^{n-1} d(i) \times \frac{dr1\{p(i)\}}{dr1\{p(n)\}} \times \frac{dr2\{k(i),k(i-1)\ldots k(i-1)\}}{dr2\{k(n),k(n-1)\ldots k(n-1)\}} \times w(i) \quad (9)$$

wherein $\hat{d}(n)$ represents the predicated value of the duration of the n-th syllable; d(i) represents the duration of the i-th syllable; w(i) represents the weighing value of the duration of the i-th syllable; p(n) represents the position of the n-th syllable; dr1{p(n)} represents the average duration of p(n) when the position of the n-th syllable within the utterance group is p(n); k(n) represents the type of the n-th syllable; and dr2{k(n), k(n−1), k(n−1)} represents the average duration of k(n) when the respective types of the (n−1)-th to n-th syllables are k(n), K(n−1), ... k(n−1).

The weighing value w(i) is determined by a factor that affects the duration of the syllable, other than the syllable type, but is fixed to be 1 in the illustrated instance. The parameter j represents the number of syllables already recognized for use in predicating the predicated value d(n) and, if the parameter j is fixed to be 1 in the illustrated instance, the predication is achieved with the use of the duration of all of the syllables recognized within the framework of the input speech. The parameter m represents the number of syllables neighboring the syllable to be used for calculating the parameter dr and, if this parameter m is fixed to be 1, the parameter dr can be calculated having been classified for each syllable type. In such case, the above equation can be rewritten as follows.

$$\hat{d}(n) = \frac{1}{n-1} \sum_{i=1}^{n-1} d(i) \times \frac{dr\{p(i)\}}{dr\{p(n)\}} \times \frac{dr\{k(i)\}}{dr\{k(n)\}} \quad (10)$$

Then, the matching unit 6 determines that the duration of the n-th syllable falls within the range expressed by the following equation (11), and then restricts a matching period to that scope so as to perform the matching according to the well-known equation discussed in connection with the prior art. A result of the matching, an end frame of the syllable and the duration of the syllable are stored in a recognition result storage buffer.

$$\hat{d}(pn) - a < d(pn) < \hat{d}(pn) + a \quad (13)$$

wherein $a$ represents a constant value.

Thereafter, a process of predicating and matching of the next succeeding syllable candidate is carried out from the start to the end of the speech period and the row of the syllable candidates which assumes the minimum value of the score S is outputted from a recognition result output unit. The switch 14 operates to output the characteristic parameter to the standard speech spectrum calculator 8 during the learning process and to the endpoint detector 3 during the recognition process.

As hereinabove described, according to the third embodiment of the present invention, by storing the average duration of the standard syllable for each syllable type and also for each syllable position within the utterance group in the standard speech duration information storage buffer, storing the duration of a speech portion of the inputted speech which has already been recognized in the input speech duration storage buffer, predicating the duration for each recognition unit of the input speech to be recognized with the use of the equation (10), using the duration of the syllable already recognized by the duration predicator and the average duration, and making a matching within a predetermined scope with the duration predicated by the matching unit taken as a center, it is possible to establish it as a recognition candidate only when the difference between the durations of the respective recognition units within the inputted speech is realistic, thereby making it possible to provide a high performance apparatus.

Also, although the syllable type and the position within the same utterance group as the syllable have been described as factors affecting the duration, it appears that the performance of predicating the duration may be improved if other factors than those factors are additionally employed. In addition, although in the foregoing third embodiment the use has been made of the equation (10) in which the weighing values of the two factors are summed, the use of the following equation (12) may be made to sum the weighing term for each additional factor if the additional factors are employed.

$$\hat{d}(n) = \frac{1}{n-1-j} \sum_{i=1}^{n-1} d(i) \times \prod_{m=1}^{M-1} \times \{w(i,m)\} \quad (12)$$

Fourth Embodiment

Figure 4:
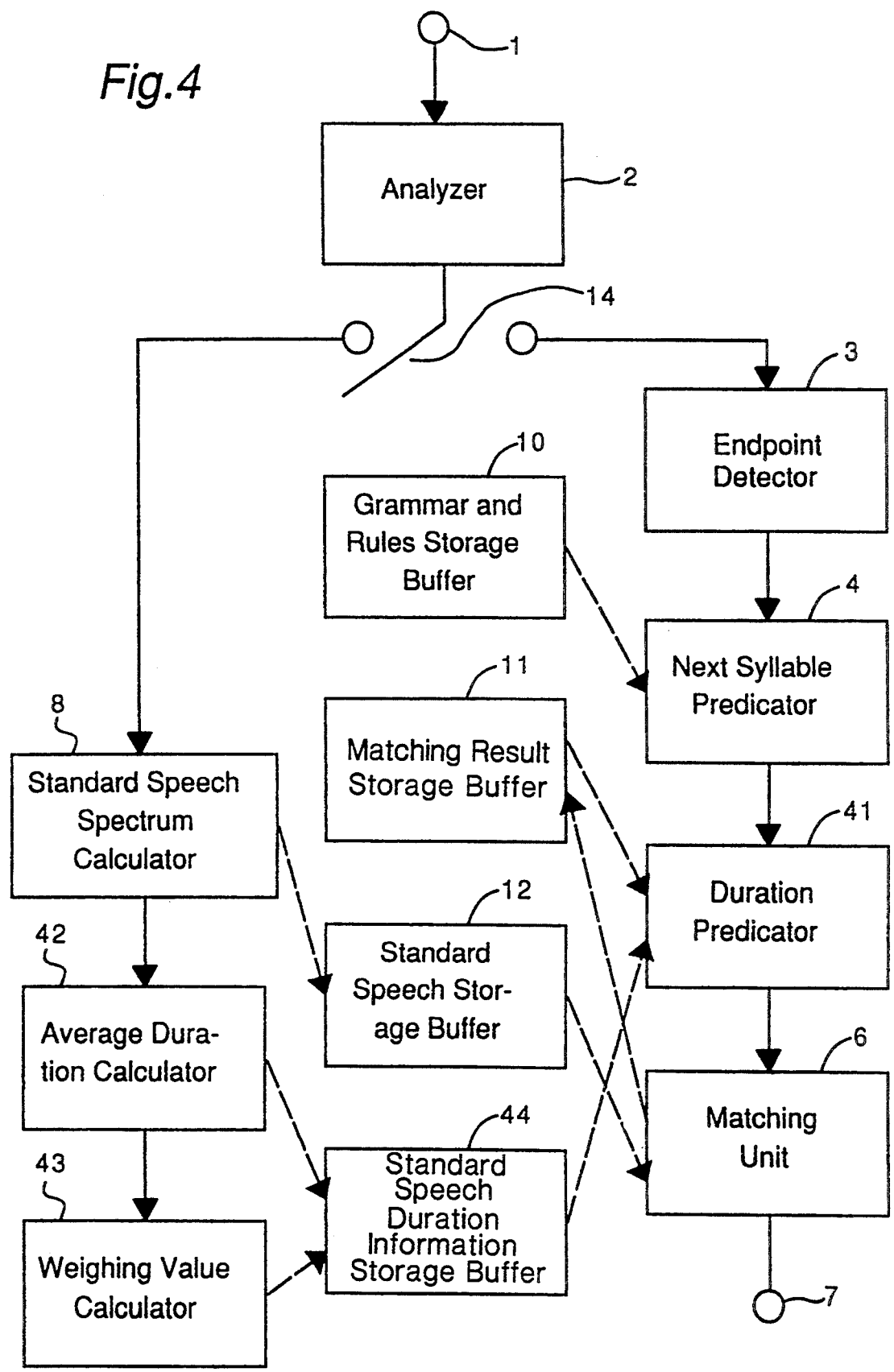

With reference to FIG. 4, a fourth embodiment of the present invention will be described. Referring now to FIG. 4, reference numeral 1 represents a speech input terminal to which a speech signal is inputted; reference numeral 2 represents an analyzer; reference numeral 3 represents a endpoint detector; reference numeral 4 represents a next syllable predicator; reference numeral 41 represents a duration predicator; reference numeral 6 represents a matching unit; reference numeral 7 represents a recognition result output terminal; reference numeral 8 represents a standard speech spectrum calculator; reference numeral 42 represents a standard speech average duration calculator; reference 43 represents a weighing value calculator for calculating the weighing value for each factor; reference numeral 10 represents a grammar and rule storage buffer; reference numeral 11 represents an matching result storage buffer; reference numeral 12 represents a standard speech storage buffer; reference numeral 44 represents a standard speech standard speech duration information storage buffer; and reference numeral 14 represents a switch.

The speech recognizing apparatus of the above described construction operates in the following manner. At the time of a standard speech learning, a standard speech spoken in units of sentences is divided in terms of syllables and a speech for each syllable is inputted from the speech input terminal 1. The analyzer 2 then analyzes spectrum information necessary for a recognition. For the spectrum information referred to above, if, for example, the LPC cepstrum method is used, the LPC cepstrum coefficient comprising a set of a predetermined number of items for each frame is calculated as a characteristic parameter. The above described analyzing cycle is repeated until a predetermined number of learning speech data terminates. Then, the data analyzed for each syllable are clustered in the standard speech spectrum calculator 8 and data of interest in each cluster are stored in the standard speech spectrum storage buffer 12.

Thereafter, at the average duration calculator 42, the average syllable duration dr1 for each position and the average duration dr2 for each syllable type both defined in connection with the previous embodiment of the present invention are stored in the standard speech duration information storage buffer 44.

Then, the weighing value $\beta m$ corresponding to the extent to which each of the factors affects the duration is calculated by the weighing value calculator 48. This can be accomplished by the determination of the weighing value $\beta m$ which would minimize the difference between the actual duration and the duration determined by the following equation (12) and can be achieved if the value L shown in the following equation (13) takes a minimum value. In this instance, in view of the equation (13) based on the method of least squares, the weighing value $\beta m$ is determined using the equation (14) and is then stored in the average duration storage buffer 44.

$$\hat{d}(n) = \frac{1}{n-1-j} \sum_{i=1}^{n-1} d(i) \times \sum_{m=1}^{M-1} \beta m \times \frac{dr(n,m)}{dr(i,m)} \quad (12)$$

wherein $\hat{d}(n)$ represents the predicated value of the duration of the n-th syllable; d(i) represents the duration of the i-th syllable; dr(n,m) represents the average duration of the recognition unit within the same group as the i-th recognition unit at the m-th factor; and $\beta m$ represents the weighing value of the m-th factor.

$$L = \sum_{r=1}^{R} \sum_{n=1}^{N} \left( d(n) - \frac{1}{n-j-1} \sum_{i=j}^{n-1} d(i) \times \sum_{m=1}^{2} \beta m \times \frac{drm(n)}{drm(i)} \right) \quad (13)$$

wherein N represents the number of syllables in one sentence and R represents the number of sentences used in learning.

$$\beta m = X^{-1} x \quad (14)$$

wherein

During the speech recognition, the speech signal is inputted through the speech input terminal 1 and the analyzer $$x = \Sigma d^{(r)}(t) (x_{t,1}^{(r)}, \ldots x_{t,m}^{(r)})^T$$

$$X_{t,m}^{(r)} = \frac{1}{n-1-j} \sum_{i=j}^{n-1} d^{(r)}(i) \frac{drm(n)}{drm(i)}$$

2 analyzes the spectrum information for each frame. A method of this analysis is similar to that during the learning. Then, the endpoint detector 3 detects a speech period using an LPC cepstrum zero-order coefficient in the analyzer (It is to be noted that the zero-order coefficient is indicative of speech power information.). The speech period includes the following two conditions.

(1) The speech power (zero-order coefficient value) is greater than a predetermined value.

(2) A frame satisfying the condition (1) above succeeds in a number greater than a predetermined value.

Thereafter, the next syllable predicator 4 selects the syllable to be subsequently recognized for each frame with the use of the grammar and rules. By way of example, where the grammar and rules to be used are a context free grammar, the grammar and rule storage buffer 10 stores a dictionary of all words to be recognized and a tree structure of junction among the words. The contents of the grammar and rule storage buffer 10 are as usual as hitherto used. When a recognizing process is to be carried out along a time axis, a syllable which would be neighboring the syllable candidate of the frame previously recognized is employed as the next syllable candidate.

The next syllable duration predicator 5 calculates the duration of the next succeeding syllable with the use of the following equation (15). This equation is used to predicate the duration of the n-th syllable candidate k as the (n−1)-th syllable has already been recognized along the time axis.

$$\hat{d}(n) = \frac{1}{n-1} \sum_{i=1}^{n-1} d(i) \times \sum_{m=1}^{2} \beta m \times \frac{drm(n)}{drm(i)} \quad (15)$$

wherein $\hat{d}(n)$ represents the predicated value of the duration of the n-th syllable; d(i) represents the duration of the i-th syllable; drm(i) represents the average duration of the syllable in the same group as the i-th syllable in the m-th factor; and $\beta m$ represents the weighing value of the m-th factor.

Then, the matching unit 6 determines that the duration of the n-th syllable falls within the range expressed by the following equation (16), and then restricts a matching period to that scope so as to perform the matching according to the well-known equation discussed in connection with the prior art. A result of the matching, an end frame of the syllable and the duration of the syllable are stored in an input speech matching result storage buffer.

$$\hat{d}(n) - a < d(n) < \hat{d}(n) + a \quad (16)$$

wherein $a$ represents a constant value.

Thereafter, a process of predicating and matching of the next succeeding syllable candidate is carried out from the start to the end of the speech period and the row of the syllable candidates which assumes the minimum value of the score S is outputted from a recognition result output unit. The switch 14 operates to output the characteristic parameter to the standard speech spectrum calculator 8 during the learning process and to the endpoint detector 3 during the recognition process.

As hereinabove described, according to the fourth embodiment of the present invention, by storing the average duration of the standard syllable for each syllable type and also for each syllable position within the utterance group in the average duration storage buffer, calculating the extent to which each factor affects the duration by the method of least squares in the weighing value calculator, storing the duration of a speech portion of the inputted speech which has already been recognized in the matching result storage buffer, predicating the duration for each recognition unit of the input speech to be recognized with the use of the equation (22), using the duration of the syllable already recognized by the duration predicator, the average duration and the weighing value for each factor, and making a matching within a predetermined scope with the duration predicated by the matching unit taken as a center, it is possible to establish it as a recognition candidate only when the difference between the durations of the respective recognition units within the inputted speech is realistic, thereby making it possible to provide a high performance apparatus.

Fifth Embodiment

Figure 5:
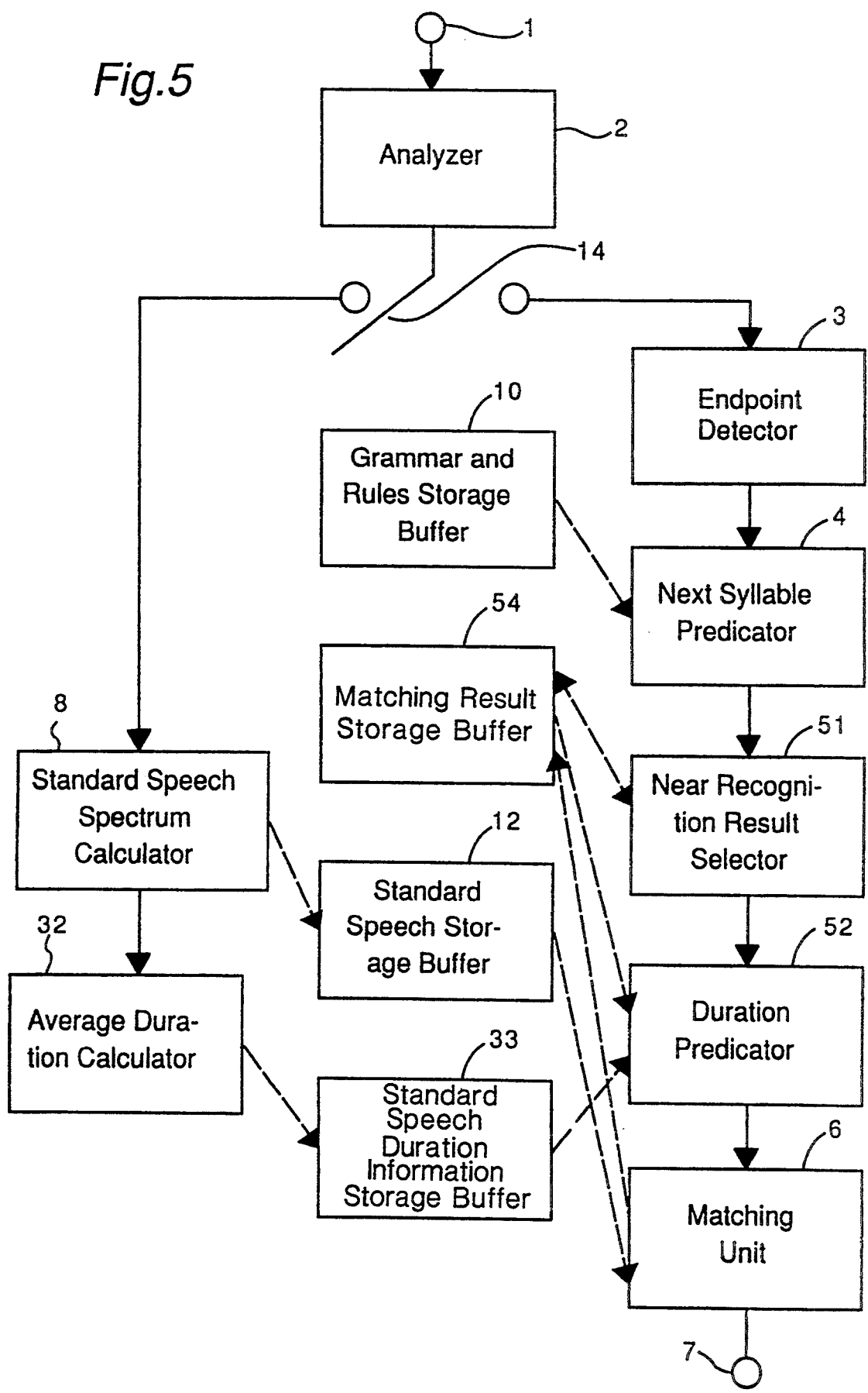

Referring to FIG. 5 showing a block diagram of a continuous speech recognizing apparatus according to a fifth embodiment of the present invention, reference numeral 1 represents a speech input terminal to which a speech signal is inputted; reference numeral 2 represents an analyzer; reference numeral 3 represents a endpoint detector; reference numeral 4 represents a next syllable predicator; reference numeral 51 represents near recognition result selector; reference numeral 52 represents a duration predicator; reference numeral 6 represents a matching unit; reference numeral 7 represents a recognition result output terminal; reference numeral 8 represents a standard speech spectrum calculator; reference numeral 9 represents a standard speech average duration calculator; reference 10 represents a grammar and rule storage buffer; reference numeral 54 represents an matching result storage buffer; reference numeral 12 represents a standard speech storage buffer; reference numeral 13 represents a standard speech duration information storage buffer; and reference numeral 14 represents a switch.

The speech recognizing apparatus of the above described construction operates in the following manner. At the time of a standard speech learning, a standard speech spoken in units of sentences is divided in terms of syllables and a speech for each syllable is inputted from the speech input terminal 1. The analyzer 2 .then analyzes spectrum information necessary for a recognition. For the spectrum information referred to above, If, for example, the LPC cepstrum method is used, the LPC cepstrum coefficient comprising a set of a predetermined number of items for each frame is calculated as a characteristic parameter and is then stored in the buffer memory 15. The above described analyzing cycle is repeated until a predetermined number of learning speech data terminates. Then, the data analyzed for each syllable are clustered in the standard speech spectrum calculator 8 and data of interest in each cluster are stored in the standard speech spectrum storage buffer.

Thereafter, the average duration dr for each syllable of the standard speech is calculated by the average duration calculator 9 and is then stored in the standard speech duration storage buffer.

During the speech recognition, the speech signal is inputted through the speech input terminal 1 and the analyzer 2 analyzes the spectrum information for each frame. A method of this analysis is similar to that during the learning. Then, the endpoint detector 3 detects a speech period using an LPC cepstrum zero-order coefficient in the analyzer (It is to be noted that the zero-order coefficient is indicative of speech power information.). The speech period includes the following two conditions.

(1) The speech power (zero-order coefficient value) is greater than a predetermined value.

(2) A frame satisfying the condition (1) above succeeds in a number greater than a predetermined value.

Thereafter, the next syllable predicator 4 selects the syllable to be subsequently recognized for each frame with the use of the grammar and rules. By way of example, where the grammar and rules to be used are a context free grammar, the grammar and rule storage buffer 10 stores a dictionary of all words to be recognized and a tree structure of junction among the words. The contents of the grammar and rule storage buffer 10 are as usual as hitherto used. When a recognizing process is to be carried out along a time axis, a syllable which would be neighboring the syllable candidate of the frame previously recognized is employed as the next syllable candidate.

The near recognition result selector 51 selects only the duration of recently recognized j recognition results from the matching result storage buffer 54 in which the duration of the recently recognized recognition results are stored.

Then, using the following equation (17), the duration predicator 52 calculates the duration of the next succeeding syllable candidate. This equation is used to predicate the duration of the n-th syllable candidate k as the (n−1)-th syllable has already been recognized along the time axis.

$$\hat{d}(n) = \frac{1}{j} \sum_{i=n-j}^{n-1} d(i) \times \frac{dr\{k(i), k(i-1) \ldots k(i-r)\}}{dr\{k(n), k(n-1) \ldots k(n-r)\}} \times w(i) \quad (17)$$

wherein $\hat{d}(n)$ represents the predicated value of the duration of the n-th syllable; d(i) represents the duration of the i-th syllable; w(i) represents the weighing value of the duration of the i-th syllable; k(n) represents the type of the n-th syllable; and dr{k(n), k(n−1), k(n−r)} represents the average duration of k(n) when the respective types of the (n−r)-th to n-th syllables are k(n), K(n−1), ... k(n−r).

The weighing value w(i) is determined by a factor that affects the duration of the syllable, other than the syllable type, but is fixed to be 1 in the illustrated instance. The parameter j represents the number of syllables already recognized for use in predicating the predicated value d(n) and, if the parameter j is fixed to be 1 in the illustrated instance, the predication is achieved with the use of the duration of all of the syllables recognized within the framework of the input speech. The parameter r represents the number of syllables neighboring the syllable to be used for calculating the parameter dr and, if this parameter r is fixed to be 1, the parameter dr can be calculated having been classified for each syllable type. In such case, the above equation can be rewritten as follows.

$$\hat{d}(n) = \frac{1}{j} \sum_{i=n-1}^{n-1} d(i) \times \frac{dr\{k(i)\}}{dr\{k(n)\}} \quad (18)$$

In the embodiment now under discussion, the equation (18) is employed.

Then, the matching unit 6 determines that the duration of the n-th syllable falls within the range expressed by the following equation (19), and then restricts a matching period to that scope so as to perform the matching according to the well-known equation discussed in connection with the prior art. A result of the matching, an end frame of the syllable and the duration of the syllable are stored in the input speech duration storage buffer.

$$\hat{d}(kn) - a < \hat{d}(kn) < \hat{d}(kn) + a \qquad (19)$$

wherein $a$ represents a constant value.

Thereafter, a process of predicating and matching of the next succeeding syllable candidate is carried out from the start to the end of the speech period and the row of the syllable candidates which assumes the minimum value of the score S is outputted from a recognition result output unit. The switch 14 operates to output the characteristic parameter to the standard speech spectrum calculator 8 during the learning process and to the endpoint detector 3 during the recognition process.

As hereinabove described, since the fifth embodiment of the present invention is such that the recognition result nearest to the input syllable portion to be subsequently recognized is selected by the near recognition result selector, a predication error can be minimized by selecting the j recognition results which have recently been recognized and by predicating the duration of the next succeeding syllable only from the j recognition results with the use of the equation (26), thereby making it possible to provide the apparatus of a high reliability.

It is to be noted that, while the foregoing fifth embodiment reference has been made to the recognizing apparatus of a type wherein, when the recognition result syllables are successively outputted along the time axis and the end of the speech comes, the syllable row having been outputted is regarded as a recognition result, the present invention can be equally applied to the recognizing apparatus wherein the recognition is carried out in the order not connected with the time axis by causing the near recognition result selector to select the j recognition result nearest to the input speech portion desired to be subsequently recognized.

Sixth Embodiment

Figure 6:
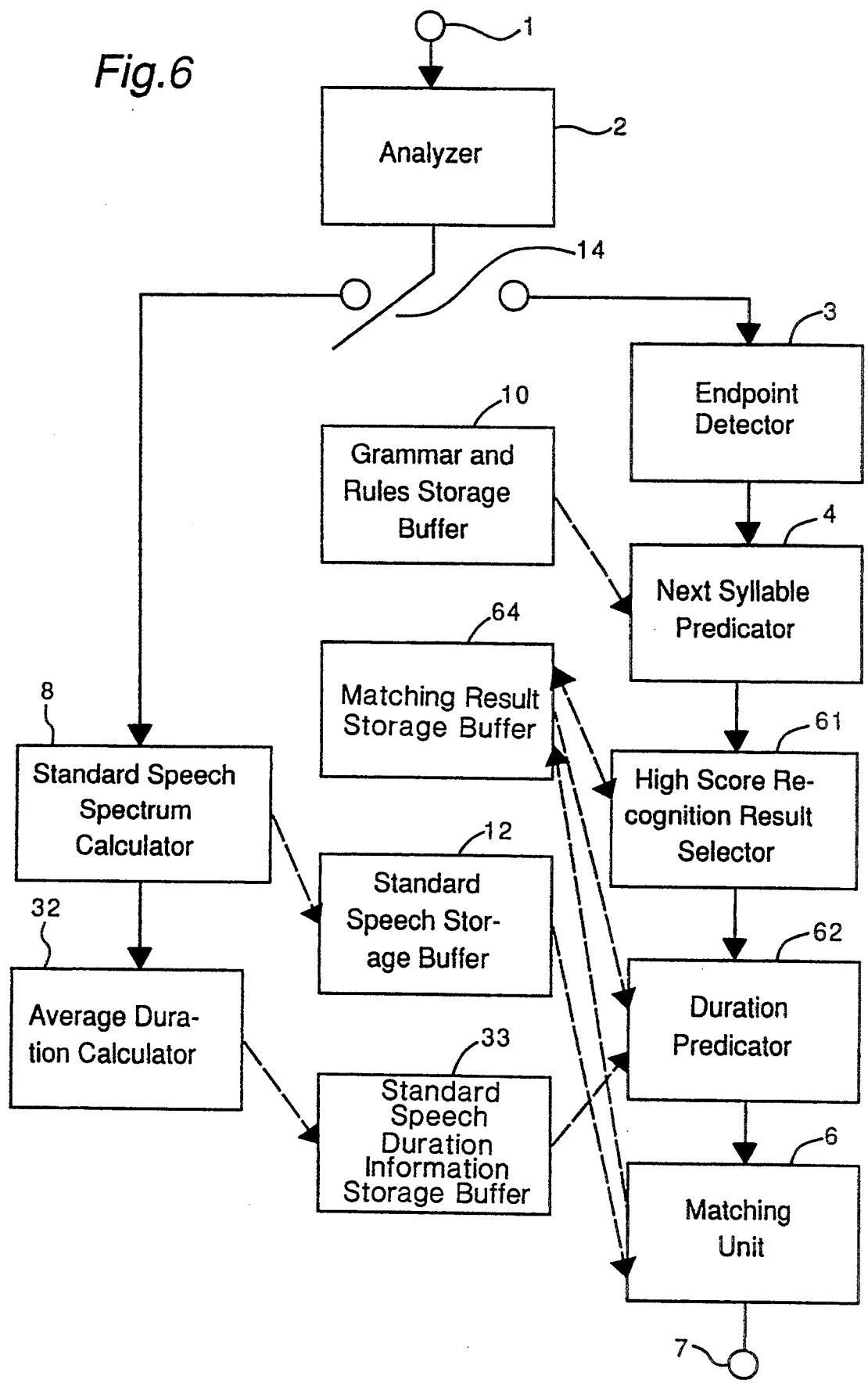

Referring to FIG. 6 showing a block diagram of a continuous speech recognizing apparatus according to a sixth embodiment of the present invention, reference numeral 1 represents a speech input terminal to which a speech signal is inputted; reference numeral 2 represents an analyzer; reference numeral 3 represents a endpoint detector; reference numeral 4 represents a next syllable predicator; reference numeral 61 represents a high score recognition result selector; reference numeral 62 represents a duration predicator; reference numeral 6 represents a matching unit; reference numeral 7 represents a recognition result output terminal; reference numeral 8 represents a standard speech spectrum calculator; reference numeral 9 represents a standard speech average duration calculator; reference 10 represents a grammar and rule storage buffer; reference numeral 64 represents an matching result storage buffer; reference numeral 12 represents a standard speech storage buffer; reference numeral 13 represents a standard average speech duration information storage buffer; and reference numeral 14 represents a switch.

The speech recognizing apparatus of the above described construction operates in the following manner. At the time of a standard speech learning, a standard speech spoken in units of sentences is divided in terms of syllables and a speech for each syllable is inputted from the speech input terminal 1. The analyzer 2 then analyzes spectrum information necessary for a recognition. For the spectrum information referred to above, if, for example, the LPC cepstrum method is used, the LPC cepstrum coefficient comprising a set of a predetermined number of items for each frame is calculated as a characteristic parameter. The above described analyzing cycle is repeated until a predetermined number of learning speech data terminates. Then, the data analyzed for each syllable are clustered in the standard speech spectrum calculator 8 and data of interest in each cluster are stored in the standard speech storage buffer.

Thereafter, the average duration dr for each syllable data is calculated by the average duration calculator 9 and is then stored in the standard speech duration information storage buffer 13.

During the speech recognition, the speech signal is inputted through the speech input terminal 1 and the analyzer 2 analyzes the spectrum information for each frame. A method of this analysis is similar to that during the learning. Then, the endpoint detector 3 detects a speech period using an LPC cepstrum zero-order coefficient in the analyzer (It is to be noted that the zero-order coefficient is indicative of speech power information.). The speech period includes the following two conditions.

(1) The speech power (zero-order coefficient value) is greater than a predetermined value.

(2) A frame satisfying the condition (1) above succeeds in a number greater than a predetermined value.

Thereafter, the next syllable predicator 4 selects the syllable to be subsequently recognized for each frame with the use of the grammar and rules. By way of example, where the grammar and rules to be used are a context free grammar, the grammar and rule storage buffer 10 stores a dictionary of all words to be recognized and a tree structure of junction among the words. The contents of the grammar and rule storage buffer 10 are as usual as hitherto used. When a recognizing process is to be carried out along a time axis, a syllable which would be neighboring the syllable candidate of the frame previously recognized is employed as the next syllable candidate.

The high score recognition result selector 51 selects only the duration of recognized j recognition results in the order from the highest score for each syllable from the input speech duration storage buffer 64 in which the duration of the recently recognized recognition results are stored.

Then, using the equation (17) discussed in connection with the previous embodiment, the duration predicator 62 calculates the duration of the next succeeding syllable candidate.

The weighing value w(i) is determined by a factor that affects the duration of the syllable, other than the syllable type, but is fixed to be 1 in the illustrated instance. The parameter j represents the number of syllables already recognized for use in predicating the predicated value d(n) and, if the parameter j is fixed to be 1 in the illustrated instance, the predication is achieved with the use of the duration of all of the syllables recognized within the framework of the input speech. The parameter r represents the number of syllables neighboring the syllable to be used for calculating the parameter dr and, if this parameter r is fixed to be 1, the parameter dr can be calculated having been classified for each syllable type and, even in this embodiment, the equation (18) discussed in connection with the previous embodiment is employed.

Then, the matching unit 6 determines that the duration of the n-th syllable falls within the range expressed by the equation (19) discussed in connection with the previous embodiment, and then restricts a matching period to that scope so as to perform the matching according to the well-known equation discussed in connection with the prior art. A result of the matching, an end frame of the syllable and the duration of the syllable are stored in the input speech duration result storage buffer 64.

Thereafter, a process of predicating and matching of the next succeeding syllable candidate is carried out from the start to the end of the speech period and the row of the syllable candidates which assumes the minimum value of the score S is outputted from a recognition result output unit. The switch 14 operates to output the characteristic parameter to the standard speech spectrum calculator 8 during the learning process and to the endpoint detector 3 during the recognition process.

As hereinabove described, according to the sixth embodiment of the present invention, the high score recognition result selector is employed to select a predetermined number j of recognition results which have exhibited higher scores and the duration predicator performs a predication of the duration of the next succeeding syllable based on the duration of the j recognition results with the use of the equation (17). With this structure, the predication error can be minimized, thereby making it possible to accomplish a high performance recognition.

It is to be noted that, in describing the sixth embodiment of the present invention, reference has been made to the apparatus wherein the syllables forming the sequentially recognized results are outputted along the time axis and, when the speech end comes, the row of the syllables which have been outputted is regarded as a finally recognized result. However, the present invention can be equally applied to the apparatus wherein the recognition is performed in the order having no concern with the time axis.

Also, in describing the sixth embodiment of the present invention, the use has been made of the high score recognition result selector for selecting a predetermined number of recognition results in the order from the recognition result of the highest score. However, arrangement may be made so that, without the number being limited, all of the recognition results of a score higher than a predetermined score can be selected. In such case, as compared with the sixth embodiment of the present invention, the number of the recognition results to be selected is indefinite and therefore a relatively long time will be required in accomplishing the calculations required for the predication, but it appears that the recognition results of a higher reliability can be selected and the predicating performance may be high.

Seventh Embodiment

Figure 7:
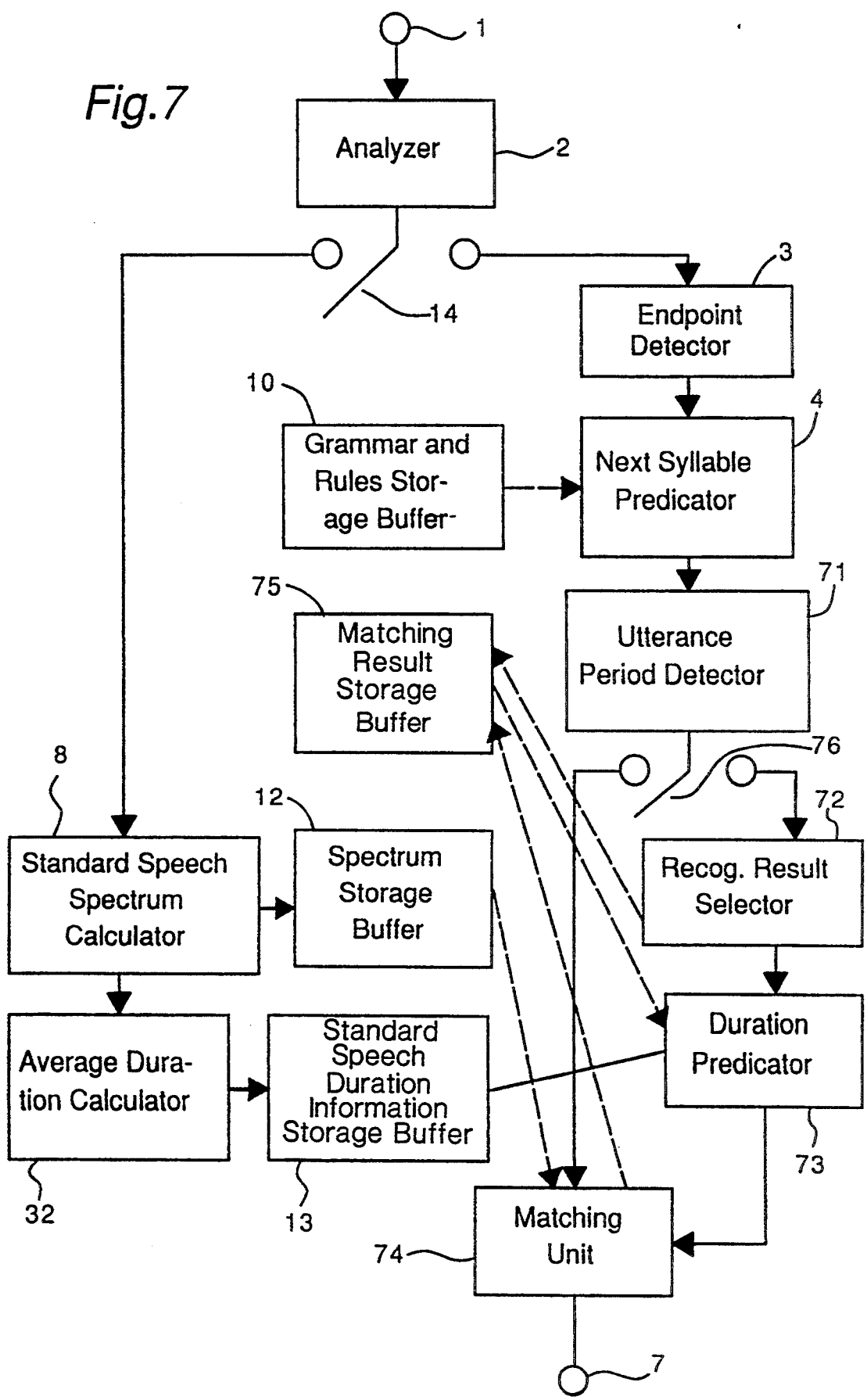

Referring now to FIG. 7, a seventh preferred embodiment of the present invention will now be described. In FIG. 7, reference numeral 1 represents a speech input terminal to which a speech signal is inputted; reference numeral 2 represents an analyzer; reference numeral 3 represents a endpoint detector; reference numeral 4 represents a next syllable predicator; reference numeral 71 represents an utterance group end detector; reference numeral 72 represents a recognition result selector; reference numeral 73 represents a duration predicator; reference numeral 74 represents a matching unit; reference numeral 7 represents a recognition result output terminal; reference numeral 8 represents a standard speech spectrum calculator; reference numeral 9 represents a standard speech average duration calculator; reference 10 represents a grammar and rule storage buffer; reference numeral 75 represents an matching result storage buffer; reference numeral 12 represents a standard speech storage buffer; reference numeral 13 represents a standard speech average duration information storage buffer; and reference numeral 14 represents a switch.

The speech recognizing apparatus of the above described construction operates in the following manner. At the time of a standard speech learning, a standard speech spoken in units of sentences is divided in terms of syllables and a speech for each syllable is inputted from the speech input terminal 1. The analyzer 2 then analyzes spectrum information necessary for a recognition. For the spectrum information referred to above, if, for example, the LPC cepstrum method is used, the LPC cepstrum coefficient comprising a set of a predetermined number of items for each frame is calculated as a characteristic parameter. The above described analyzing cycle is repeated until a predetermined number of learning speech data terminates. Then, the data analyzed for each syllable are clustered in the standard speech spectrum calculator 8 and data of interest in each cluster are stored in the standard speech storage buffer.

Thereafter, the average duration dr for each syllable data is calculated by the average duration calculator 9 and is then stored in the standard speech average duration storage buffer 13.

During the speech recognition., the speech signal is inputted through the speech input terminal 1 and the analyzer 2 analyzes the spectrum information for each frame. A method of this analysis is similar to that during the learning. Then, the endpoint detector 3 detects a speech period using an LPC cepstrum zero-order coefficient in the analyzer (It is to be noted that the zero-order coefficient is indicative of speech power information.). The speech period includes the following two conditions.

(1) The speech power (zero-order coefficient value) is greater than a predetermined value.

(2) A frame satisfying the condition (1) above succeeds in a number greater than a predetermined value.

Thereafter, the next syllable predicator 4 selects the syllable to be subsequently recognized for each frame with the use of the grammar and rules. By way of example, where the grammar and rules to be used are a context free grammar, the grammar and rule storage buffer 10 stores a dictionary of all words to be recognized and a tree structure of junction among the words. The contents of the grammar and rule storage buffer 10 are as usual as hitherto used. When a recognizing process is to be carried out along a time axis, a syllable which would be neighboring the syllable candidate of the frame previously recognized is employed as the next syllable candidate.

The utterance period end detector 71 examines as to whether or not there is a silent sound period between the inputted speech portion already recognized and the inputted speech portion to be subsequently recognized and, if there is the silent sound period which is not the end of a sentence, a series of syllable rows from the preceding silent sound period is regarded a single utterance period. There is two conditions for the silent sound period.

(1) The speech power (zero-order coefficient) is lower than a predetermined value.

(2) Frames that satisfy the condition (1) above succeed in a number greater than a predetermined number D.

Then, if it is determined that the last syllable already recognized by the utterance period end detector is not an utterance period end, the recognition result selector selects only the result of recognition of the same utterance period as that of the input speech portion to be subsequently recognized from the recognition result duration storage buffer, followed by a calculation of the duration of the next succeeding syllable candidate by the duration predicator 18 using the equation (18) discussed in connection with the fifth embodiment of the present invention. Thereafter, the matching unit 74 determines that the duration of the n-th syllable falls within the scope expressed by the equation (19) discussed in connection with the previous embodiment, and then restricts a matching period.

On the other hand, if it is determined that the last syllable recognized by the utterance period end detector is the end of the utterance period, it is determined that the duration of the syllable which is a new utterance period to be newly recognized cannot be predicated from the already recognized duration and, therefore, no duration predication is carried out, but the matching is performed in the matching unit 74. In such case, the matching period is a predetermined scope $\gamma$ which is as follows.

$$\gamma < d(kn) < \gamma \qquad (20)$$

wherein $\gamma$ is a constant value.

By limiting the matching period as defined above, the matching is carried out on the basis of the equation (1) discussed in connection with the prior art. The result of the matching, the end frame of the syllable and the duration of the syllable are stored in the input speech duration storage buffer 12. The switch 14 operates to output the characteristic parameter to the standard speech spectrum calculator 8 during the learning process and to the endpoint detector 3 during the recognition process. Also, a switch 76 operates to output the characteristic parameter to the matching unit, if the last syllable recognized by the utterance period end detector is determined as the end of the utterance period, but to the recognition result selector if it is not determined as the end of the utterance period.

As hereinabove described, according to the seventh embodiment of the present invention, the utterance period end detector determines whether or not that the last syllable recognized is the end of the utterance period and, only if it is not the end of the utterance period, the recognition result selector selects the recognition result within the same utterance period while the duration predicator predicates the duration of the next succeeding syllable from the selected recognition result using the equation (18) discussed hereinbefore. Therefore, the predication error can advantageously be minimized, making it possible to accomplish the recognition of a higher performance.

In the foregoing description of the seventh embodiment of the present invention, reference has been made to the recognizing apparatus wherein the recognition result syllables are sequentially outputted along the time axis and, when it reaches the end of the speech, the syllable row outputted until that time is regarded as the recognition result. However, even in the recognizing apparatus wherein the recognition is carried in the order not connected with the time axis, similar effects can be appreciated by causing the recognition result selector to select the recognition result within the same utterance period at all time if the utterance period in which the input speech portion to be subsequently recognized is clear.

Eighth Embodiment

Figure 8:
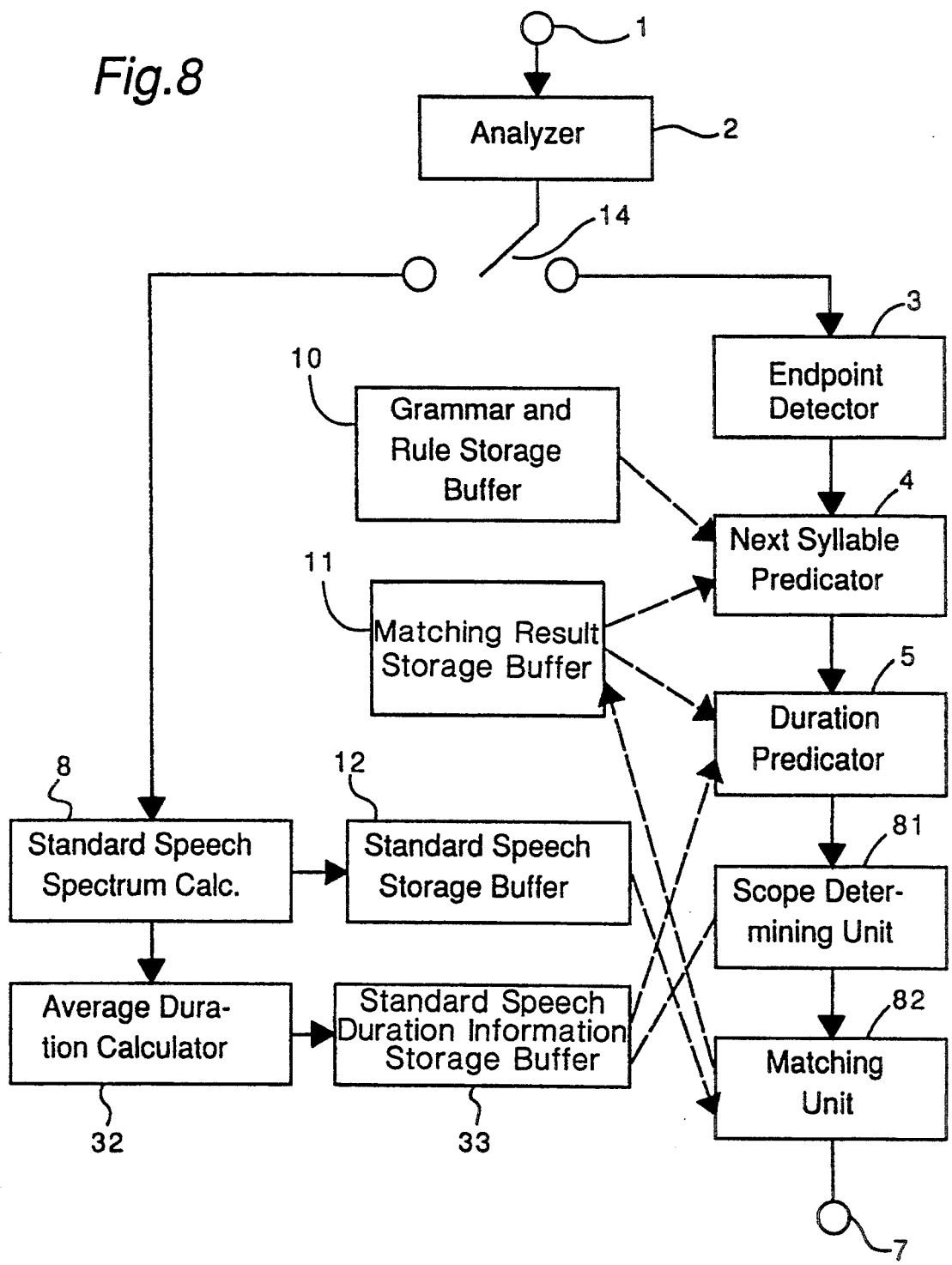

The recognizing apparatus according to an eighth embodiment of the present invention is shown in FIG. 8. Referring now to FIG. 8, reference numeral 1 represents a speech input terminal to which a speech signal is inputted; reference numeral 2 represents an analyzer; reference numeral 3 represents a endpoint detector; reference numeral 4 represents a next syllable predicator; reference numeral 5 represents a duration predicator; reference numeral 81 represents a matching period determining unit; reference numeral 82 represents a matching unit; reference numeral 7 represents a recognition result output terminal; reference numeral 8 represents a standard speech spectrum calculator; reference numeral 9 represents a standard speech average duration calculator; reference 10 represents a grammar and rule storage buffer; reference numeral 11 represents an matching result storage buffer; reference numeral 12 represents a standard speech storage buffer; reference numeral 13 represents a standard speech duration information storage buffer; and reference numeral 14 represents a switch.

The speech recognizing apparatus of the above described construction operates in the following manner. At the time of a standard speech learning, a standard speech spoken in units of sentences is divided in terms of syllables and a speech for each syllable is inputted from the speech input terminal 1. The analyzer 2 then analyzes spectrum information necessary for a recognition. For the spectrum information referred to above, if, for example, the LPC cepstrum method is used, the LPC cepstrum coefficient comprising a set of a predetermined number of items for each frame is calculated as a characteristic parameter. The above described analyzing cycle is repeated until a predetermined number of learning speech data terminates.

Then, the characteristic parameters analyzed for each syllable are clustered in the standard speech calculator 8 and data of interest in each cluster are stored in the standard speech spectrum storage buffer.

Thereafter, at the average duration calculator 9, the average syllable duration dr for each syllable so divided as hereinabove described is averaged for each syllable type which is in turn stored in the standard speech average duration storage buffer 13.

During the speech recognition, the speech signal is inputted through the speech input terminal 1 and the analyzer 2 analyzes the spectrum information for each frame. A method of this analysis is similar to that during the learning. Then, the endpoint detector 3 detects a speech period using an LPC cepstrum zero-order coefficient in the analyzer (It is to be noted that the zero-order coefficient is indicative of speech power information.). The speech period includes the following two conditions.

(1) The speech power (zero-order coefficient value) is greater than a predetermined value.

(2) A frame satisfying the condition (1) above succeeds in a number greater than a predetermined value.

Thereafter, the next syllable predicator 4 selects the syllable to be subsequently recognized for each frame with the use of the grammar and rules. By way of example, where the grammar and rules to be used are a context free grammar, the grammar and rule storage buffer 10 stores a dictionary of all words to be recognized and a tree structure of junction among the words. The contents of the grammar and rule storage buffer 10 are as usual as hitherto used. When a recognizing process is to be carried out along a time axis, a syllable which would be neighboring the syllable candidate of the frame previously recognized is employed as the next syllable candidate.

The next syllable duration predicator 5 calculates the duration of the next succeeding syllable with the use of the previously mentioned equation (5).

The matching period determining unit 81 determines, with the use of the following equation (21), the scope in which the syllable to be subsequently recognized exists, that is, the matching period, with respect to the syllable predicated by the next syllable candidate predicator 4 and included in the data stored in the standard speech average duration storage buffer 13.

$$\hat{d}(k,n) - a < d(k,n) < \hat{d}(k,n) + a \quad (21)$$

wherein $a$ represents a constant value.

Then, the matching unit 82 determines that the duration of the n-th syllable falls within the range expressed by the equation (21), and then restricts a matching period to that scope so as to perform the matching according to the well-known equation (1) discussed in connection with the prior art. A result of the matching, an end frame of the syllable and the duration of the syllable are stored in a recognition result storage buffer 12.

Thereafter, a process of predicating and matching of the next succeeding syllable candidate is carried out from the start to the end of the speech period and the row of the syllable candidates which assumes the minimum distance D in all speech periods is outputted from a recognition result output unit as a finally recognized result. The switch 14 operates to output the characteristic parameter to the standard speech spectrum calculator 8 during the learning process and to the endpoint detector 3 during the recognition process.

As hereinabove described, according to the eighth embodiment of the present invention, by storing the average duration $dr\{k\}$ of the standard syllable in the standard speech average duration storage buffer, storing the duration of a speech portion of the inputted speech which has already been recognized in the input speech duration storage buffer, predicating the duration for each recognition unit of the input speech to be recognized with the use of the equation (18), using the duration of the syllable already recognized by the duration predicator and the average duration, causing the matching period determining unit to define the matching period of the predicated syllable as shown by the equation (21), and causing the matching unit to make a matching within this matching period, it is possible to establish it as a recognition candidate only when the difference between the durations of the respective recognition units within the inputted speech is realistic, thereby making it possible to provide a high performance apparatus.

In describing the foregoing eighth embodiment of the present invention, reference has been made to the method of predicating the duration wherein the syllable type is a factor that affects the duration. However, where the factor affecting the duration is unknown, arrangement may be made wherein the weighing value w(i) effective to minimize the predicating error is learned so that the learned weighing value w(i) can be used during the recognition.

Ninth Embodiment

Figure 9:
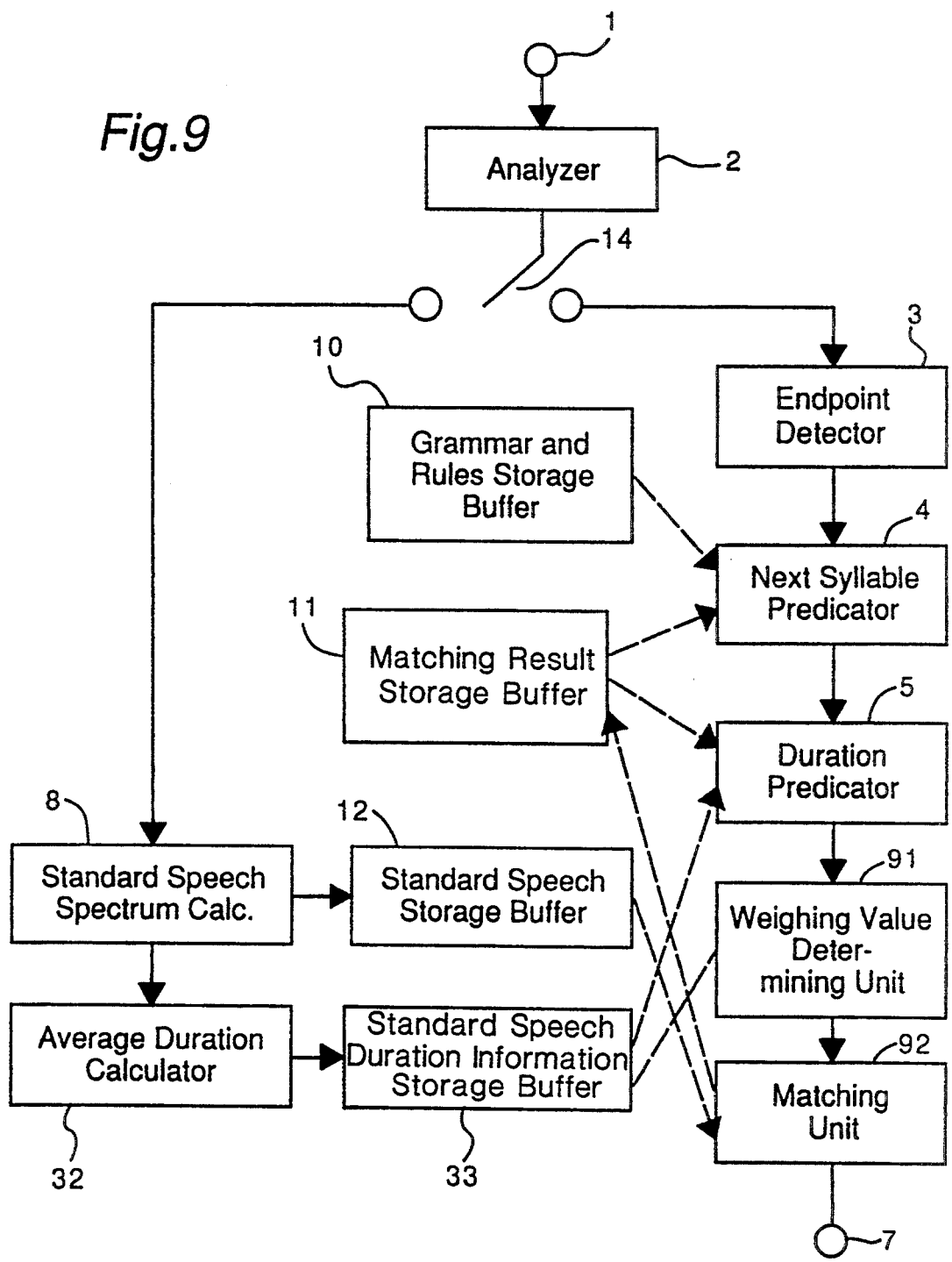
Figure 10:
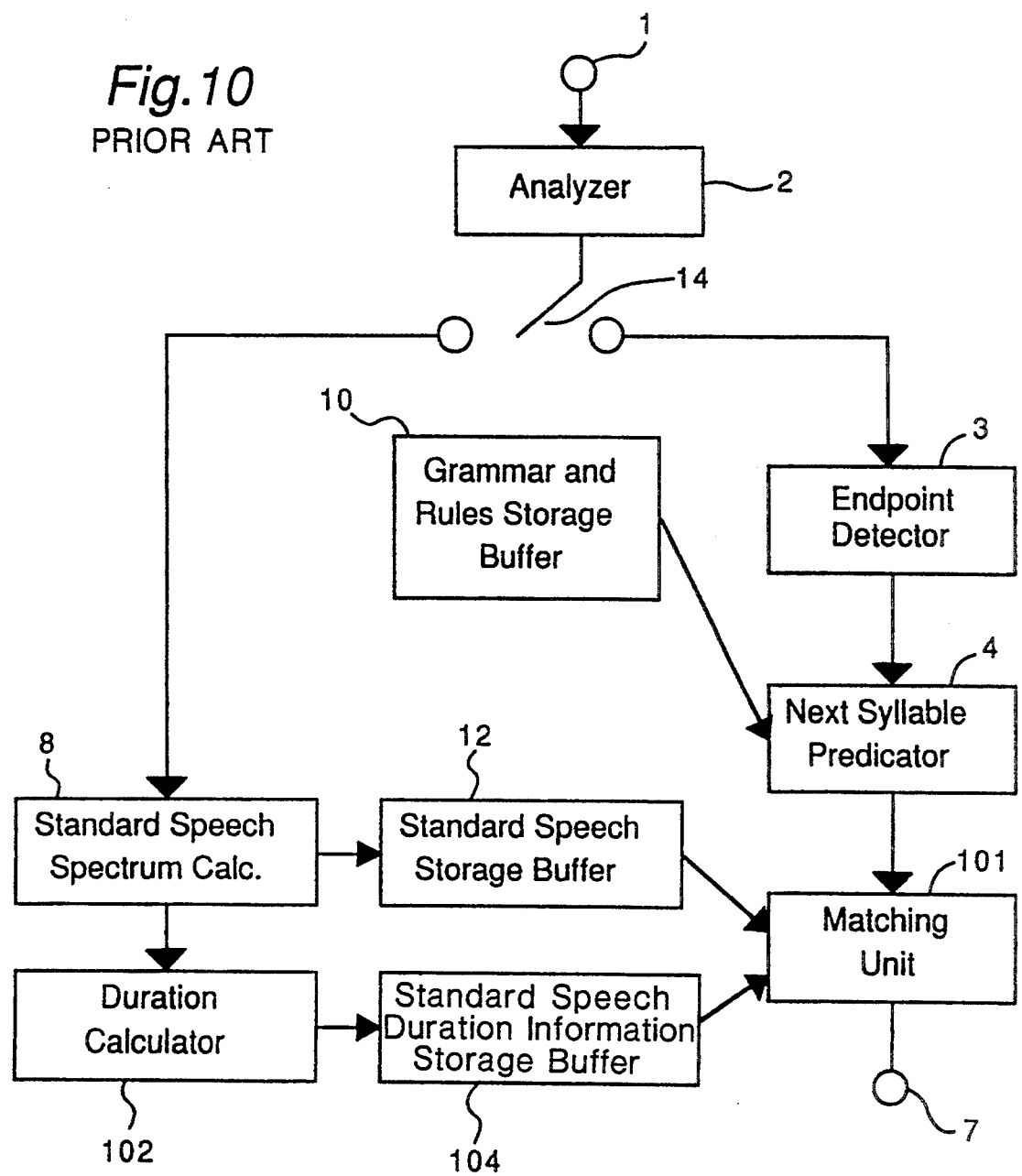
FIG. 10 is a schematic block diagram showing the prior art speech recognizing apparatus.
Figure 11:
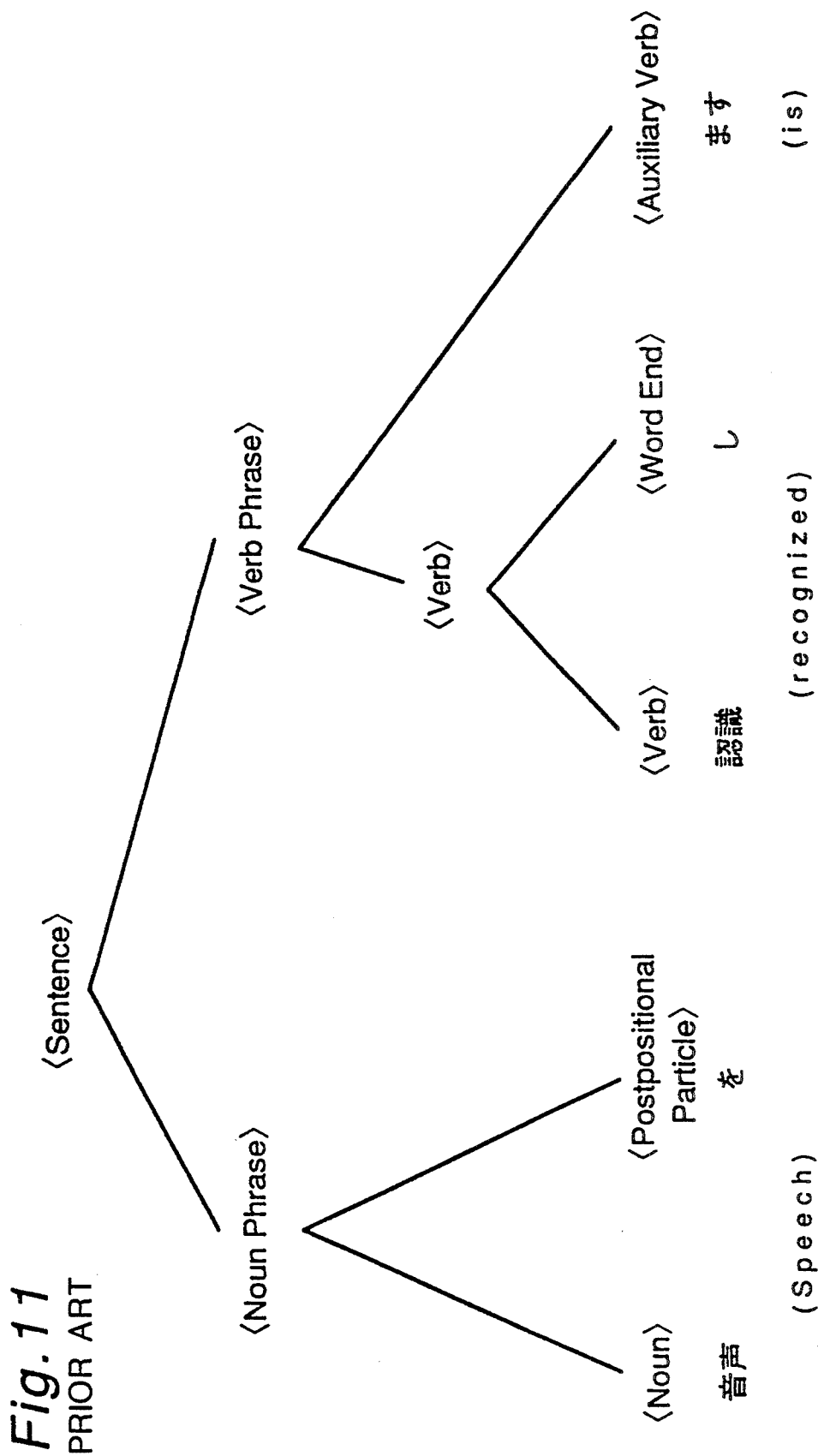
FIG. 11 is a diagram showing the context free grammar and rules.

The recognizing apparatus according to a ninth embodiment of the present invention is shown in FIG. 9. Referring now to FIG. 9, reference numeral 1 represents a speech input terminal to which a speech signal is inputted; reference numeral 2 represents an analyzer; reference numeral 3 represents a endpoint detector; reference numeral 4 represents a next syllable predicator; reference numeral 5 represents a duration predicator; reference numeral 91 represents a matching weighing value determining unit; reference numeral 92 represents a matching unit; reference numeral 7 represents a recognition result output terminal; reference numeral 8 represents a standard speech spectrum calculator; reference numeral 9 represents an average duration ratio calculator; reference 10 represents a grammar and rule storage buffer; reference numeral 11 represents an input speech duration storage buffer; reference numeral 93 represents a standard speech average duration storage buffer; and reference numeral 14 represents a switch.

The speech recognizing apparatus of the above described construction operates in the following manner. At the time of a standard speech learning, a standard speech spoken in units of sentences is divided in terms of syllables and a speech for each syllable is inputted from the speech input terminal 1. The analyzer 2 then analyzes spectrum information necessary for a recognition. For the spectrum information referred to above, if, for example, the LPC cepstrum method is used, the LPC cepstrum coefficient comprising a set of a predetermined number of items for each frame is calculated as a characteristic parameter. The above described analyzing cycle is repeated until a predetermined number of learning speech data terminates.

Then, the characteristic parameters analyzed for each syllable are clustered in the standard speech spectrum calculator 8 and data of interest in each cluster are stored in the standard speech storage buffer.

Thereafter, at the standard speech average duration calculator 9, the average syllable duration for each syllable so divided as hereinabove described is averaged for each syllable type which is in turn stored in the standard speech average duration storage buffer 93.

During the speech recognition, the speech signal is inputted through the speech input terminal 1 and the analyzer 2 analyzes the spectrum information for each frame. A method of this analysis is similar to that during the learning. Then, the endpoint detector 3 detects a speech period using an LPC cepstrum zero-order coefficient in the analyzer (It is to be noted that the zero-order coefficient is indicative of speech power information.). The speech period includes the following two conditions.

(1) The speech power (zero-order coefficient value) is greater than a predetermined value.

(2) A frame satisfying the condition (1) above succeeds in a number greater than a predetermined value.

Thereafter, the next syllable predicator 4 selects the syllable to be subsequently recognized for each frame with the use of the grammar and rules. By way of example, where the grammar and rules to be used are a context free grammar, the grammar and rule storage buffer 10 stores a dictionary of all words to be recognized and a tree structure of junction among the words. The contents of the grammar and rule storage buffer 10 are as usual as hitherto used. When a recognizing process is to be carried out along a time axis, a syllable which would be neighboring the syllable candidate of the frame previously recognized is employed as the next syllable candidate.

The next syllable duration predicator 5 calculates a predicated value $\hat{d}(n,k)$ of the duration of the next syllable in a manner similar to that described in connection with the eighth embodiment of the present invention.

Then, the matching weighing value determining unit 91 makes use of the following equation (22) to determine the weighing value dw. This weighing value is so calculated that the matching score is small as the duration predicated by the duration predicator at the time of matching approaches this weighing value.

$$dw(len) = \qquad (22)$$
$$\frac{1}{\alpha} \times len + 1 - \frac{\hat{d}(n,k)}{\alpha} \quad (\hat{d}(n,k) - \alpha < len < \hat{d}(n,k))$$

$$dw(len) =$$
$$-\frac{1}{\alpha} \times len + 1 + \frac{\hat{d}(n,k)}{\alpha} \quad (\hat{d}(n,k) \leq len \leq \hat{d}(n,k) + \alpha)$$

Then, the matching unit 6 performs the matching according to the following equation (23)

$$D(i) = min[D(j) + \{Dn(j+1:i) \times dw(i-j)\}] \qquad (23)$$

wherein D(i) represents the distance between the standard speech syllable row and the input speech to the i-th frame; Dn(j+1:1) represents the distance between the syllable n of the standard speech and the input speech from the (j+1)-th frame to the i-th frame; and dw(i−j) represents the weighing value when the syllable length of the syllable n is (i−j).

Thereafter, a process of predicating and matching of the next succeeding syllable candidate is carried out from the start to the end of the speech period and the row of the syllable candidates which exhibit the minimum score D(i) is outputted from a recognition result output unit as a finally recognized result. The switch 14 operates to output the characteristic parameter to the standard speech spectrum calculator 8 during the learning process and to the endpoint detector 3 during the recognition process.

As hereinabove described, according to the ninth embodiment of the present invention, by storing the average duration $dr\{k\}$ of the standard syllable in the standard speech average duration ratio storage buffer, storing the duration of a speech portion of the inputted speech which has already been recognized in the input speech duration storage buffer, predicating the duration for each recognition unit of the input speech to be recognized with the use of the duration of the syllable already recognized by the duration predicator and the average duration, causing the weighing value determining unit to determine the weighing value, with the use of the equation (22), which corresponds to the duration so that the matching distance in the neighborhood of the predicated durations may become convenient, and causing the matching unit to perform a calculation of the distance with reference to the matched weighing value, it is possible to establish it as a recognition candidate only when the difference between the durations of the respective recognition units within the inputted speech is realistic, thereby making it possible to provide a high performance apparatus.

In describing the foregoing eighth embodiment of the present invention, reference has been made to the method of predicating the duration wherein the syllable type is a factor that affects the duration. However, where the factor affecting the duration is unknown, arrangement may be made wherein the weighing value w(i) effective to minimize the predicating error is learned so that the learned weighing value w(i) can be used during the recognition.

With the present invention having been fully described, the following advantages can be appreciated.

With the speech recognizing apparatus according to the first aspect of the present invention, information of the duration of that input speech portion of the input speech which has been recognized is stored in the input speech duration storage buffer so that, with the use of the duration information, the duration of a recognition unit to be subsequently recognized by the duration predicator, followed by a matching in the matching unit with the use of the predicated duration. Therefore, only when the difference in duration of the recognition units within the input speech is realistic, it can be established as a recognition candidate, thereby making it possible to realize the high performance apparatus.

With the speech recognizing apparatus according to the second aspect of the present invention, by storing information concerning the correlation of the respective durations of the recognition units of the standard speech in the standard speech duration storage buffer, storing the input speech portion of the input speech already recognized in the input speech duration storage buffer, predicating the duration of each of the recognition units of the input speech to be subsequently recognized by the duration predicator with the use of the standard speech duration information and the input speech duration information and matching in the matching unit with the use of the predicated duration, it can be established as a recognition candidate, thereby making it possible to realize the high performance apparatus.

With the speech recognizing apparatus according to the third aspect of the present invention, by storing information concerning the correlation of the respective durations of the recognition units of the standard speech in the standard speech duration storage, storing in the input speech duration storage buffer the duration of the input speech portion of the input speech already recognized, predicating by the duration predicator the duration of each recognition unit of the input speech to be subsequently recognized with the use of the following equation (24) in which the standard speech duration information and the input speech duration information are utilized, and matching in the matching unit with the use of the predicated duration, it can be established as a recognition candidate, thereby making it possible to realize the high performance apparatus:

$$\hat{d}(n) = \frac{1}{n-1-j} \sum_{i=j}^{n-1} d(i) \times w(i) \quad (24)$$

wherein represents the predicated value of the duration of the n-th syllable; d(i) represents the duration of the i-th syllable; and w(i) represents the weighing value of the duration of the i-th syllable.

With the speech recognizing apparatus according to the fourth aspect of the present invention, by storing in the standard speech duration storage buffer the respective average durations of the recognition units of the standard speech for each type, storing in the input speech duration storage buffer the duration of the input speech portion of the input speech already recognized, predicating by the duration predicator the duration of each recognition unit of the input speech to be subsequently recognized with the use of the previously discussed equation (2) in which the average duration for each type and the input speech duration information are utilized, and matching in the matching unit with the use of the predicated duration, it can be established as a recognition candidate, thereby making it possible to realize the high performance apparatus.

With the speech recognizing apparatus according to the fifth aspect of the present invention, by storing in the standard speech duration storage buffer the respective average durations of the recognition units of the standard speech for each position within the utterance period, storing in the input speech duration storage buffer the duration of the input speech portion of the input speech already recognized, predicating by the duration predicator the duration of each recognition unit of the input speech to be subsequently recognized with the use of the previously discussed equation (3) in which the average duration for each position and the input speech duration information are utilized, and matching in the matching unit with the use of the predicated duration, it can be established as a recognition candidate, thereby making it possible to realize the high performance apparatus.

With the speech recognizing apparatus according to the sixth aspect of the present invention, by storing in the standard speech duration storage buffer the respective information of correlation of the durations of the recognition unit of the standard speech which has been classified for each factor that affects the duration,, storing in the input speech duration storage buffer the duration of the input speech portion of the input speech already recognized, predicating by the duration predicator the duration of each recognition unit of the input speech to be subsequently recognized with the use of the previously discussed equation (12) in which the duration information and the input speech duration information are utilized, and matching in the matching unit with the use of the predicated duration, it can be established as a recognition candidate, thereby making it possible to realize the high performance apparatus.

With the speech recognizing apparatus according to the seventh aspect of the present invention, by storing in the standard speech duration storage buffer the respective average durations of the recognition units of the standard speech for each type and the average durations for each position within the utterance period, storing in the input speech duration storage buffer the duration of the input speech portion of the input speech already recognized, predicating by the duration predicator the duration of each recognition unit of the input speech to be subsequently recognized with the use of the previously discussed equation (9) in which the standard speech average duration information and the input speech duration information are utilized, and matching in the matching unit with the use of the predicated duration, it can be established as a recognition candidate, thereby making it possible to realize the high performance apparatus.

With the speech recognizing apparatus according to the eighth aspect of the present invention, by calculating the duration information of each recognition unit of the input speech for each of factors that affect the duration and the weighing value for each factor, storing the calculated duration information for each factor and the weighing value in the standard speech duration storage buffer, storing in the input speech matching duration storage buffer the duration of the input speech portion of the input speech already recognized, predicating by the duration predicator the duration of each recognition unit of the input speech to be subsequently recognized with the use of the previously discussed equation (9) in which the ratio of the average durations and the input speech duration information are utilized, and matching in the matching unit with the use of the predicated duration, it can be established as a recognition candidate, thereby making it possible to realize the high performance apparatus.

With the speech recognizing apparatus according to the ninth aspect of the present invention, by selecting in the recognition result selector information most important in predicating the duration of the recognition unit preferentially out from the recognition result duration information, predicating the duration of the recognition unit to be subsequently recognized by the use of the selected duration information, and matching in the matching unit with the use of the predicated duration, it can be established as a recognition candidate, thereby making it possible to realize the high performance apparatus.

With the speech recognizing apparatus according to the tenth aspect of the present invention, by selecting in the recognition result selector the duration information preferentially from the recognition result which is closest to the input speech in terms of time, predicating the duration of the recognition unit to be subsequently recognized by the use of the selected duration information, and matching in the matching unit with the use of the predicated duration, it can be established as a recognition candidate, thereby making it possible to realize the high performance apparatus.

With the speech recognizing apparatus according to the eleventh aspect of the present invention, by selecting in the recognition result selector the duration information preferentially from the recognition result which exhibits the highest score during the matching, predicating the duration of the recognition unit to be subsequently recognized by the use of the selected duration information, and matching in the matching unit with the use of the predicated duration, it can be established as a recognition candidate, thereby making it possible to realize the high performance apparatus.

With the speech recognizing apparatus according to the twelfth aspect of the present invention, by determining, during a recognition, in the utterance period determining unit the utterance period to which the input speech portion to be subsequently recognized belongs, selecting in the recognition result selector only the duration information within the same utterance period as the input speech portion to be subsequently recognized, predicating in the duration predicator the duration of the recognition unit to be subsequently recognized with the use of the selected duration information, and matching in the matching unit with the use of the predicated duration, it can be established as a recognition candidate, thereby making it possible to realize the high performance apparatus.

With the speech recognizing apparatus according to the thirteenth aspect of the present invention, by predicating the duration of each recognition unit of the input speech to be subsequently recognized with the use of the duration of the syllable, already recognized by the duration predicator, and the duration of the recognition unit of the standard speech, determining the optimum matching period for each recognition unit with the use of the duration predicated by the matching period determining unit, and matching in the matching unit with the use of the determined matching period, it can be established as a recognition candidate, thereby making it possible to realize the high performance apparatus.

With the speech recognizing apparatus according to the fourteenth aspect of the present invention, by predicating the duration of each recognition unit of the input speech to be subsequently recognized with the use of the correlation between the duration of the syllable recognized by the duration predicator and the duration of the recognition unit of the standard speech, determining in the matching weighing value determining unit the weighing value corresponding to the duration so that the matching distance in the vicinity of the predicated duration may be convenient, and calculating in the matching unit the distance with the matching weighing value take into consideration, it can be established as a recognition candidate, thereby making it possible to realize the high performance apparatus.

Although the present invention has fully been described in connection with the various embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A speech recognizing apparatus for recognizing an input speech by dividing a total utterance period of the input speech to be recognized into a plurality of small sections, each one of said plurality of small sections forming a recognition unit of the input speech, said speech recognizing apparatus comprising:

a matching unit for performing a matching between a reference speech and the input speech for each one of the recognition units and for outputting a matching result;

a matching result storage buffer for storing the matching result and duration data representing a duration of each one of the recognition units which have already been matched by the matching unit; and a duration predicator for predicating the duration data for each one of the recognition units to be subsequently matched by the matching unit using the stored duration data; and wherein the matching unit performs the matching between the reference speech and the input speech for each of the recognition units using the duration data predicated by the duration predicator.

2. A speech recognizing apparatus according to claim 1 wherein the reference speech is divided into a plurality of smaller reference sections, each one of said plurality of smaller reference sections forming a reference recognition unit, the speech recognizing apparatus further comprising a reference speech duration storage buffer for storing correlation information of reference duration data representing a duration of each one of the recognition units of the reference speech; and wherein the duration predicator also predicates the duration data for each one of the recognition units of the input speech to be subsequently recognized using the correlation information stored in the reference speech storage buffer and the duration data for each one of the recognition units of the input speech.

3. A speech recognizing apparatus according to claim 1 wherein the input speech has syllables and wherein the duration predicator predicates the duration data for each one of the recognition units of the input speech using the following equation:

$$\hat{d}(n) = \frac{1}{n-1-j} \sum_{i=j}^{n-1} d(i) \times w(i)$$

where $\hat{d}(n)$ represents a predicated value of the duration data of an n-th syllable of the input speech; $d(i)$ represents the duration data of an i-th syllable of the input speech; and $w(i)$ represents a weighing value of the duration data of an i-th syllable of the input speech.

4. A speech recognizing apparatus according to claim 3 wherein the reference speech has syllable types and wherein the reference speech is divided into a plurality of smaller reference sections, each one of said plurality of smaller reference sections forming a reference recognition unit, the speech recognizing apparatus further comprises a reference speech duration storage buffer for storing average duration data representing an average duration of each one of the reference recognition units of the reference speech for each one of the syllable types, and wherein the duration predicator predicates the duration for each one of the recognition units of the input speech using the following equation:

$$\hat{d}(n) = \frac{1}{n-1-j} \sum_{i=n-j}^{n-1} d(i) \times \frac{dr\{k(i),k(i-1)\ldots k(i-r)\}}{dr\{k(n),k(n-1)\ldots k(n-r)\}} \times w(i)$$

where $\hat{d}(n)$ represents the predicated value of the duration data of the n-th syllable of the input speech; $d(i)$ represents the duration of the i-the syllable of the input speech; $w(i)$ represents the weighing value of the duration data of the i-th syllable of the input speech; $k(n)$ represents the syllable type of the n-th syllable of the input speech; and $dr(k(n), k(n-1), k(n-r))$ represent an average duration data of $k(n)$ when a syllable type of $(n-r)$-th to n-th syllable types are respectively $k(n), k(n-1), \ldots k(n-r)$.

5. A speech recognizing apparatus according to claim 3 wherein the reference speech is divided into a plurality of smaller reference sections, each one of said plurality of smaller reference sections forming a reference recognition unit and the speech recognizing apparatus further comprises a reference speech duration storage buffer for storing an average duration data representing an average duration of each one of the reference recognition units of the reference speech for each one of the utterance periods, and wherein the duration predicator predicates the duration data of each one of the recognition units of the input speech using the following equation:

$$\hat{d}(n) = \frac{1}{n-1-j} \sum_{i=j}^{n-1} d(i) \times \frac{dr\{p(i)\}}{dr\{p(n)\}} \times w(i)$$

where $\hat{d}(n)$ represents the predicated duration of the duration data of the n-th syllable of the input speech; d(i) represents the duration data of the i-th syllable of the input speech; w(i) represents the weighing value of the duration data of an i-th syllable of the input speech; p(n) represents a position of the n-th syllable of the input speech; and dr (p(n)) represents an average duration of p(n) when the position of the n-th syllable within the utterance group is p(n).

6. A speech recognizing apparatus according to claim 3 wherein the reference speech is divided into a plurality of smaller reference sections, each one of said plurality of smaller reference sections forming a reference recognition unit, the speech recognizing apparatus further comprises a reference speech duration storage buffer for storing duration information of each of a plurality of factors that affect the duration of each one of the reference recognition units, and wherein the duration predicator predicates the duration of each one of the recognition units of the input speech using the following equation:

$$\hat{d}(n) = \frac{1}{n-1-j} \sum_{i=1}^{n-1} d(i) \times \prod_{m=1}^{M-1} \times \{w(i,m)\}$$

where $\hat{d}(n)$ represents the predicated value of the duration data of the n-th syllable of the input speech; d(i) represents the duration data of the i-th syllable of the input speech; and w(i,m) represents a weighing value relative to d(i) at an m-th one of the factors that affects the duration of each one of the recognition units.

7. A speech recognizing apparatus according to claim 6 wherein the reference speech has syllable types and wherein the reference speech duration storage buffer stores a first average duration of each one of the reference recognition units of the reference speech for each one of the utterance periods and a second average duration of each one of the reference recognition units of the reference speech for each one of the syllable types, and wherein the duration predicator predicates the duration of each one of the recognition units of the input speech using the following equation:

$$\hat{d}(n) = \frac{1}{n-1-j} \sum_{i=j}^{n-1} d(i) \times \frac{dr1\{p(i)\}}{dr1\{p(n)\}} \times \frac{dr2\{k(i),k(i-1)\ldots k(i-1)\}}{dr2\{k(n),k(n-1)\ldots k(n-1)\}} \times w(i)$$

where $\hat{d}(n)$ represents the predicated value of the duration of the n-th syllable; d(i) represents the duration of the i-th syllable; w(i) represents the weighing value of the duration of the i-th syllable; p(n) represents the position of the n-th syllable; dr1(p(n)) represents an average duration of p(n) when the position of the n-th syllable within the utterance group is p(n); k(n) represents the syllable type of the n-th syllable; and dr2(k(n), k(n−1), k(n−1) represent an average duration of k(n) when respective syllable types of the (n−1)-th to n-th syllables are k(n), k(n−1), ... k(n−1) .

8. A speech recognizing apparatus according to claim 3 further comprising a weighing value determining unit for calculating the weighing value for each one of a plurality of factors, said weighting value is a degree of influence on the duration data, and a reference speech duration storage buffer for storing the weighing value and the duration data of each one of the recognition units already matched, and wherein the duration predicator predicates the duration of each one of the recognition units of the input speech using the following equation:

$$\hat{d}(n) = \frac{1}{n-1-j} \sum_{i=1}^{n-1} d(i) \times \sum_{m=1}^{M-1} \beta m \times \frac{dr(n,m)}{dr(i,m)}$$

where $\hat{d}(n)$ represents the predicated value of the duration of the n-th syllable; d(i) represents the duration of the i-th syllable; dr(n,m) represents an average duration of the recognition unit within a same group as an i-th recognition unit at an m-th one of the plurality of factors; and $\beta m$ represents the weighing value of the m-th one of the plurality of factors.

9. A speech recognizing apparatus according to claim 1 further comprising:

a recognition result selector for selecting duration data to predicate the duration of a recognition unit, and wherein the duration predicator predicates the duration of one of the recognition units to be subsequently matched using the selected duration data.

10. A speech recognizing apparatus according to claim 9 wherein the recognition result selector preferentially selects the duration data from the matching result which is closest to the input speech in time.

11. A speech recognizing apparatus according to claim 9 wherein during matching the matching unit produces a plurality of scores and wherein the recognition result selector preferentially selects the duration data from the recognition result which has a highest score from the plurality of scores produced during matching.

12. A speech recognizing apparatus according to claim 9 further comprising:

an utterance period determining unit for determining the utterance period to which the recognition unit of the input speech portion to be subsequently matched belongs, and wherein the recognition result selector only selects the duration data within a same one of one of the utterance periods as the recognition unit of the input speech is subsequently matched.

13. A speech recognizing apparatus according to claim 1 further comprising:

an endpoint detector unit for determining a matching period to be used during the matching of the input speech, and wherein an optimum matching period for each one of the recognition units is determined by the matching unit using the duration data predicated by the duration predicator and wherein the matching performed by the matching unit uses the determined matching period.

14. A speech recognizing apparatus according to claim 1 further comprising:

a weighing value determining unit for determining a matching weighing value corresponding to the duration data to make a matching distance of the predicated duration data convenient, and wherein the matching unit calculates the matching distance using the matching weighing value.

* * * * *

UNITED STATES PATENT AND TRADEMARK OFFICE
CERTIFICATE OF CORRECTION

PATENT NO. : 5,444,817
DATED : August 22, 1995
INVENTOR(S) : Takizawa

It is certified that error appears in the above-identified patent and that said Letters Patent is hereby corrected as shown below:

Column 30, line 53, "i=n-j" should be --i=j--.

Signed and Sealed this

Second Day of April, 1996

*Attest:*

BRUCE LEHMAN

*Attesting Officer*   *Commissioner of Patents and Trademarks*